(12) United States Patent
Hendry et al.

(10) Patent No.: US 9,928,297 B2
(45) Date of Patent: Mar. 27, 2018

(54) SAMPLE GROUPING SIGNALING IN FILE FORMATS

(71) Applicant: QUALCOMM Incorporated, San Diego, CA (US)

(72) Inventors: Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 14/969,954

(22) Filed: Dec. 15, 2015

(65) Prior Publication Data
US 2016/0232233 A1 Aug. 11, 2016

Related U.S. Application Data

(60) Provisional application No. 62/115,087, filed on Feb. 11, 2015.

(51) Int. Cl.
*G06F 17/30* (2006.01)
*H04N 19/70* (2014.01)
(Continued)

(52) U.S. Cl.
CPC ....... *G06F 17/30784* (2013.01); *H04N 19/46* (2014.11); *H04N 19/50* (2014.11);
(Continued)

(58) Field of Classification Search
CPC ........ G06F 17/30784; H04N 21/85406; H04N 19/70; H04N 19/46; H04N 19/50; H04N 19/85
(Continued)

(56) References Cited

U.S. PATENT DOCUMENTS 8,849,778 B2 * 9/2014 Doehla ................. H04N 17/00
327/551
9,591,383 B2 * 3/2017 Maze ................. H04N 21/4728
(Continued)

FOREIGN PATENT DOCUMENTS

WO 2014170547 A1 10/2014

OTHER PUBLICATIONS

Gang, Bai, et al., "File format for storage of scalable video", Journal of Zhejiang University—Science A, vol. 7, Issue 5, May 2006, pp. 706-712.*

(Continued)

*Primary Examiner* — Robert Stevens
(74) *Attorney, Agent, or Firm* — Shumaker & Sieffert, P.A.

(57) ABSTRACT

A device generates, in a container box of a file for storage of video contents, a SampleGroupDescription box that provides a sample group description for a sample grouping. The SampleGroupDescription box includes a grouping type syntax element having a particular value. Additionally, the SampleGroupDescription box includes one or more sample group entries. The device generates, in the same container box, a plurality of SampleToGroup boxes. Each respective SampleToGroup box of the plurality of SampleToGroup boxes includes a respective grouping type syntax element having the particular value, includes a respective sample count syntax element indicating a number of samples in a respective sample grouping, and includes a respective group description index syntax element indicating an index of an entry in the SampleGroupDescription box which describes samples of the respective sample grouping. Each sample of the respective sample grouping comprises a respective picture of the video contents.

25 Claims, 13 Drawing Sheets

(51) Int. Cl.
  H04N 19/46      (2014.01)
  H04N 19/50      (2014.01)
  H04N 19/85      (2014.01)
  H04N 21/854     (2011.01)
(52) U.S. Cl.
  CPC ............ *H04N 19/70* (2014.11); *H04N 19/85* (2014.11); *H04N 21/85406* (2013.01)
(58) Field of Classification Search
  USPC ....................................................... 707/803
  See application file for complete search history.

(56) References Cited

U.S. PATENT DOCUMENTS

| | | | |
|---|---|---|---|
| 2004/0167925 A1* | 8/2004 | Visharam ......... | H04N 21/23424 |
| 2006/0233247 A1* | 10/2006 | Visharam ........... | G11B 27/3027 375/240.12 |
| 2007/0016594 A1 | 1/2007 | Visharam et al. | |
| 2009/0055417 A1* | 2/2009 | Hannuksela ...... | G06F 17/30858 |
| 2010/0153395 A1* | 6/2010 | Hannuksela ......... | G11B 27/102 707/737 |
| 2010/0198798 A1* | 8/2010 | Doehla ................ | H04L 1/0082 707/696 |
| 2012/0185570 A1* | 7/2012 | Bouazizi .......... | H04N 21/44016 709/219 |
| 2012/0230433 A1* | 9/2012 | Chen .................... | H04N 19/503 375/240.25 |
| 2013/0170561 A1* | 7/2013 | Hannuksela ..... | H04N 21/23424 375/240.25 |
| 2014/0098868 A1 | 4/2014 | Wang | |
| 2015/0193494 A1* | 7/2015 | Malamal Vadakital ............... | H04N 21/85 707/697 |

OTHER PUBLICATIONS

Hendry, et al., "A Partial Protection Scheme Based on Layer Dependency of Scalable Video Coding", VIE 2008, Xian, China, Jul. 29-Aug. 1, 2008, pp. 777-782.*
Amon, Peter, et al., "File Format for Scalable Video Coding", IEEE Transactions on Circuits and Systems for Video Technology, vol. 17, No. 9, Sep. 2007, pp. 1174-1185.*
International Preliminary Report on Patentability from International Application No. PCT/US2015/066095, dated Apr. 25, 2017, 7 pp.
International Search Report and Written Opinion from International Application No. PCT/US2015/066095 , dated Apr. 1, 2016, 12 pages.
ISO/IEC 14996-12 International Standard, "Information technology—Coding of audio-visual objects Part 12: ISO base media file format," Oct. 1, 2005, 94 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang et al., "High Efficiency Video Coding (HEVC) Defect Report", 14th Meeting, Jul. 25 through Aug. 2, 2013, Vienna, AT; (Joint Collaborative Team on Video Coding (JCT-VC) of ITU-T SG 16 WP 3 and ISO/IEC JTC 1/SC 29/WG 11), JCTVC-N1003_V1, Sep. 27, 2013, 312 pp.
Tech et al., "MV-HEVC Draft Text 5," 5th Meeting, Jul. 25 through Aug. 2, 2013, Vienna, AT; (Joint Collaborative Team on 3D Video Coding Extension Development of ITU-T SG 16 WP 3 and ISO/IEC JTC 1/SC 29/WG 11); JCT3V-E1004_v6, Aug. 7, 2013, 65 pp.
Flynn et al., "High Efficiency Video Coding (HEVC) range Extensions text specification: Draft 4," 13th Meeting, Apr. 18 through 26, 2013, Incheon, KR; (Joint Collaborative Team on Video Coding (JCT-VC) of ITU-T SG 16 WP 3 and ISO/IEC JTC 1/SC 29/WG 11), JCTVC-N1005_v1, Aug. 7, 2013, 334 pp.
Tech et al., "3D-HEVC Draft Text 1," 5th Meeting, Jul. 27 through Aug. 2, 2013, Vienna, AT; (Joint Collaborative Team on 3D Video Coding Extension Development of ITU-T SG 16 WP 3 and ISO/IEC JTC 1/SC 29/WG 11),JCT3V-E1001_v3, Sep. 11, 2013, 89 pp.
Chen et al., "High Efficiency Video Coding (HEVC) scalable extension draft 3," 14th Meeting, Jul. 25 through Aug. 3, 2013, Vienna, AT; (Joint Collaborative Team on Video Coding (JCT-VC) of ITU-T SG 16 WP 3 and ISO/IEC JTC 1/SC 29/WG 11), JCTVC-N1008_V3, Sep. 16, 2013, 68 pp.
Response to Written Opinion dated Apr. 1, 2016, from international application No. PCT/US2015/066095, filed Jun. 7, 2016, 4 pp.
Second Written Opinion of International Application No. PCT/US2015/066095, dated Oct. 12, 2016, 4 pp.
Response to Second Written Opinion dated Oct. 12, 2016, from International Application No. PCT/US2015/066095, dated Dec. 12, 2016, 6 pp.
"International Standard ISO/IEC 14496-14, Information Technology—Coding of audio-visual objects—Part 14: MP4 file format," First Edition, Nov. 15, 2003, 18 pp.
"International Standard ISO/IEC 14496-15, Information Technology—Coding of audio-visual objects—Part 15: Carriage of network abstraction layer (NAL) unit structured video in ISO base media file format," Third Edition, Jul. 1, 2014, 124 pp.
3GPP TS 26.244 V9.1.0, 3rd Generation Partnership Project; Technical Specification Group Services and System Aspects; Transparent end-to-end packet switched streaming service (PSS); 3GPP file format (3GP), (Release 12), Dec. 2013, 61 pp.
"International Standard ISO/IEC 23008-2, Information Technology—High efficiency coding and media delivery in heterogeneous environments—Part 2 High Efficiency video coding", First Edition, Dec. 1, 2013, 312 pp.
"International Standard ISO/IED 15444-12, Information Technology—JPEG 2000 image coding system—Part 12 ISO base media file formatt", 5th Edition, Dec. 15, 2015, 248 pp.
International Standard ISO/IEC 14496-12, Information Technology—Coding of audio-visual objects—Part 12: ISO base media file format, Third Edition, Oct. 15, 2008, 120 pp.

* cited by examiner

SAMPLE GROUPING SIGNALING IN FILE FORMATS

This application claims the benefit of U.S. Provisional Patent Application 62/115,087, filed Feb. 11, 2015, the entire content of which is incorporated by reference.

TECHNICAL FIELD

This disclosure relates to video coding and file formats for coded video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

One or more aspects of this disclosure relate to storage of video contents in file formats. For instance, the techniques of this disclosure may improve the design of sample grouping mechanism and signaling of stream access point (SAP) sample grouping in files formed according to the ISO base media file format and file formats derived based on it.

In one aspect, this disclosure describes a method of generating a file for storage of video contents, the method comprising: generating, in a container box of the file, a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; generating, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and outputting the file.

In another aspect, this disclosure describes a device for generating a file for storage of video contents, the device comprising: a memory configured to store the file; and one or more processors configured to: generate a container box of the file such that the file conforms to a particular file format, wherein as part of generating the container box, the one or more processors: generate a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; and generate, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and output the file.

In another aspect, this disclosure describes a device for generating a file for storage of video contents, the device comprising: means for generating a container box of the file such that the file conforms to a particular file format, wherein the means for generating the container box comprises: means for generating a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; and means for generating, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and means for outputting the file.

In another aspect, this disclosure describes a computer-readable data storage medium having stored thereon instructions that, when executed, cause one or more processors of a device for generating a file for storage of video contents to: generate a container box of the file such that the file conforms to a particular file format, wherein, as part of generating the container box, the one or more processors: generate a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; and generate, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and output the file.

In another aspect, this disclosure describes a device for reading a file for storage of video contents, the device comprising: a memory configured to store the file; and one or more processors configured to obtain, from the file, a container box of the file, wherein the container box comprises: a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents.

In another aspect, this disclosure describes a method for reading a file for storage of video contents, the method comprising: obtaining the file; and obtaining, from the file, a container box of the file, wherein the container box comprises: a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents.

In another aspect, this disclosure describes a device for reading a file for storage of video contents, the device comprising: means for obtaining the file; and means for obtaining, from the file, a container box of the file, wherein the container box comprises: a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents.

In another aspect, this disclosure describes a computer readable storage medium having stored thereon instructions that, when executed, cause a device to: obtain, from the file, a container box of the file, wherein the container box comprises: a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents.

The details of one or more examples of the disclosure are set forth in the accompanying drawings and the description below. Other features, objects, and advantages will be apparent from the description, drawings, and claims.

DETAILED DESCRIPTION

Figure 1:
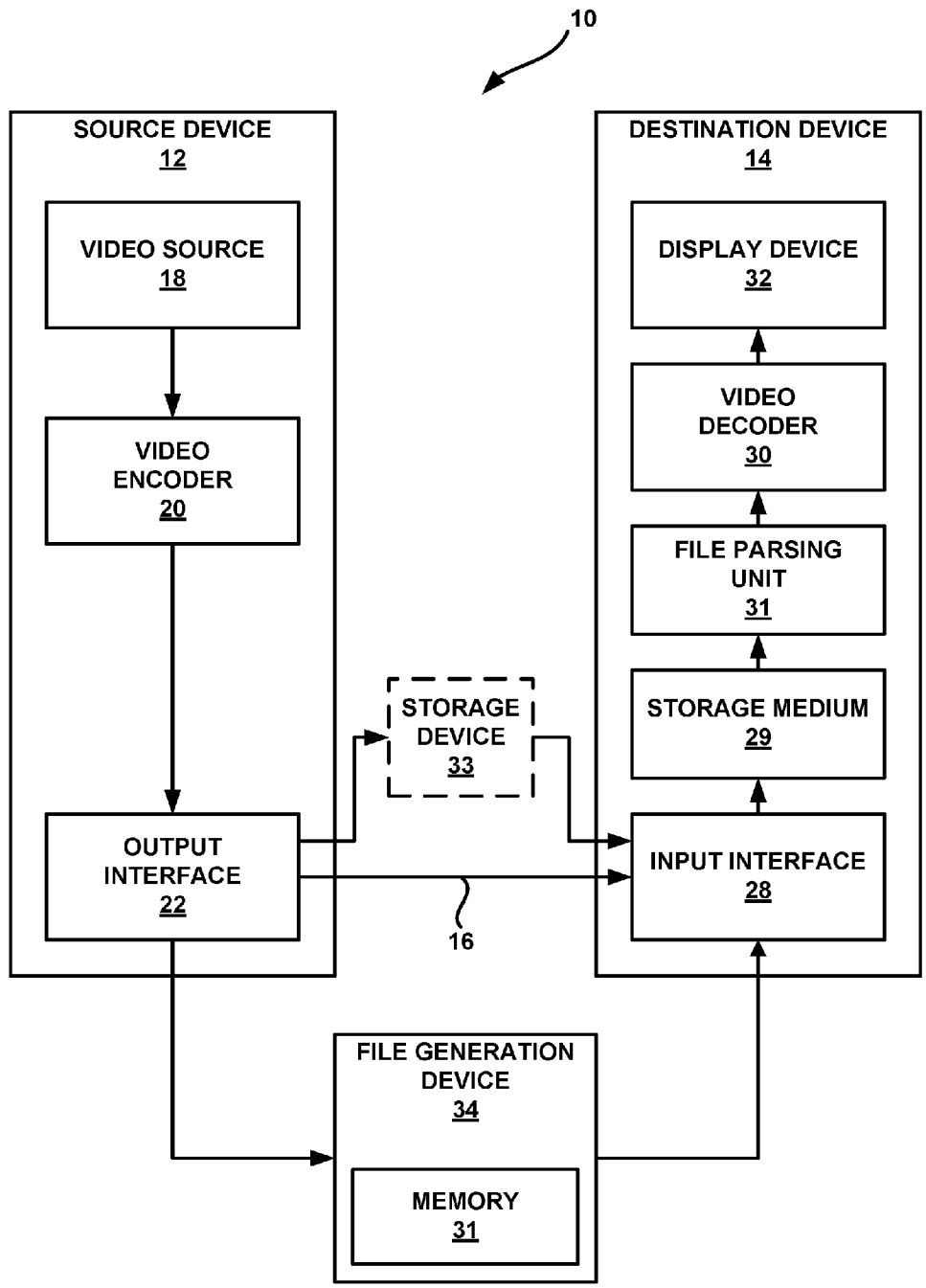
FIG. 1 is a block diagram illustrating an example video encoding and decoding system that may use the techniques described in this disclosure.

The International Standards Organization (ISO) base media file format (ISOBMFF) and file formats derived from the ISO base media file format are designed for storage of video contents. ISOBMFF is defined in terms of a set of nested "boxes" that store encoded video data and associated metadata. For instance, a media data box may include one or more samples. Each of the samples may include encoded video data of one or more pictures in an access unit.

In addition, the boxes in an ISOBMFF file may include SampleToGroup boxes and SampleGroupDescription boxes. In this disclosure, SampleToGroup boxes may be referred to as "Sample to Group boxes" and SampleGroupDescription boxes may be referred to as "Sample Group Description boxes." In general terms, a SampleToGroup box includes syntax elements defining one or more groups of samples. In this disclosure, groups of samples may also be referred to as "sample groups" or "sample groupings." Furthermore, in general terms, a SampleGroupDescription box includes descriptions of sample groups.

More specifically, a SampleToGroup box includes a grouping type syntax element. The grouping type syntax element may also be referred to as the grouping type syntax element. Additionally, the SampleToGroup box includes one or more sample group entries. Each respective sample group entry in the SampleToGroup box includes a respective sample count syntax element and a respective group description index syntax element. The respective sample count syntax element indicates the number of consecutive samples to which the respective group description index applies.

A SampleGroupDescription box also includes a grouping type syntax element. When the grouping type syntax elements of a SampleToGroup box and a SampleGroupDescription box match, the SampleToGroup box and the SampleGroupDescription box are said to correspond to one another. A SampleGroupDescription box includes one or more group description entries. Each respective group description entry in a SampleGroupDescription box includes a description of a respective sample group. A group description index in a SampleToGroup box identifies a corresponding group description entry in the corresponding SampleGroupDescription box.

For example, a SampleToGroup box may have a first sample group entry that includes a sample count syntax element having a value equal to 5 and a group description index having a value equal to 3. Hence, in this example, five consecutive samples belong to a sample group described by the third group description entry in the corresponding SampleGroupDescription box. In this example, the SampleToGroup box may have a second sample group entry that includes a sample count syntax element having a value equal to 4 and a group description index having a value equal to 2. Hence, in this example, the next four consecutive samples belong to a sample group described by the second group description entry in the corresponding SampleGroupDescription box.

There are multiple versions of ISOBMFF. In one version of ISOBMFF, which is referred to as version 1, the SampleToGroup box includes a grouping type parameter syntax element in addition to the syntax elements described above. The grouping type parameter syntax element is a separate syntax element from the grouping type syntax element. This disclosure may refer to a sample group defined in a SampleToGroup box defined in version 1 of ISOBMFF as a version 1 sample group. The grouping type parameter syntax element may be denoted as grouping_type_parameter. The grouping type parameter syntax element is not present in SampleToGroup boxes of files conforming to the initial version of ISOBMFF. The grouping type parameter syntax element is an indication of a sub-type of the sample grouping. Thus, a SampleToGroup box may include a "grouping type" syntax element and a separate "grouping type parameter" syntax element.

A version of the ISOBMFF specification, which is hereinafter referred to simply as "the ISOBMFF specification" or "N14574" is available from http://phenix.int-evry.fr/mpeg/doc_end_user/documents/109_Sapporo/wg11/w14574-v2-w14574.zip. The ISOBMFF specification comprises a document entitled ISO/IEC 15444-12, fourth edition, Information technology—JPEG 2000—image coding system—Part 12: ISO base media file format, 15 Jul. 2012, as modified by COR 1, FDAM1, FDAM2, COR2, and FDAM 3 (hereinafter, "15444-12" or the "15444-12 specification"). The ISOBMFF specification also comprises a document entitled Singer et al., "ISO/IEC 14496-12, Amd. 4, improved audio support," ISO/IEC JTC1/SC29/WG11, MPEG2014/w14325, 25 Jul. 2014, Sapporo, Japan (hereinafter, "14496-12" or the "14996-12 specification").

The introduction of the grouping type parameter syntax element in the SampleToGroup box raises several issues. For example, with the introduction of the grouping type parameter syntax element, the grouping type of a version 1 sample group is actually defined by both the grouping type syntax element and the grouping type parameter syntax element. Defining the grouping type of a version 1 sample group in this way may be problematic because other portions of the ISOBMFF specification, which is available from rely on the assumption that the grouping type of a sample group is defined solely by the grouping type parameter syntax element. For example, the semantics defined in the ISOBMFF specification for the SampleGroupDescription box do not account for the grouping type parameter syntax element in any way. Other examples are described elsewhere in this disclosure.

This disclosure describes several techniques for addressing such issues. For instance, in accordance with a technique of this disclosure, it is proposed to define the relationship between SampleGroupDescription boxes and SampleToGroup boxes for the same grouping types as a 1 to N relationship, where N is a positive non-zero integer. Thus, multiple SampleToGroup boxes having grouping type syntax elements with the same value may correspond a single SampleGroupDescription box having a grouping type syntax element having that value. In some instances, each of these SampleToGroup boxes may have grouping type parameter syntax elements having different values. Defining the relationship in this way may resolve the issue described above without changing the syntax of the SampleGroupDescription box or the SampleToGroup box. Instead, implementation of this example may only involve changes to the semantics and descriptions of the SampleGroupDescription box and/or the SampleToGroup box.

In accordance with one example of this technique, a source device may generate, in a container box of the file, a SampleGroupDescription box that includes one or more group description entries. In this disclosure, a container box is a box that contains one or more other boxes. In the ISOBMFF extensions for carriage of HEVC and other video formats, example types of container boxes include sample table boxes, track fragment boxes, and other types of boxes. Each respective group description entry provides descriptions for a respective sample group. The SampleGroupDescription box further includes a grouping type syntax element that identifies a type of sample grouping. In this example, the grouping type syntax element in the SampleGroupDescription box has a particular value and the container box is a sample table box or a track fragment box. Furthermore, in this example, the source device may generate, in the same container box of the file, a plurality of SampleToGroup boxes. In this example, each respective SampleToGroup box of the plurality of SampleToGroup boxes includes a respective grouping type syntax element having the particular value. Additionally, each respective SampleToGroup box includes one or more sample group entries. Each respective sample group entry of the one or more sample group entries comprises a respective sample count syntax element indicating a number of samples in a respective sample group. Each respective sample group entry of the one or more sample group entries comprises a respective group description index syntax element indicating an index of a group description entry in the SampleGroupDescription box that provides a description of the respective sample group. Each sample of the respective sample group comprises one or more pictures of the video content. In this example, the source device may output the file.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Hence, source device 12 and destination device 14 may be considered wireless communication devices. Source device 12 and destination device 14 may be considered video devices.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode the captured, pre-captured, or computer-generated video. Source device 12 may transmit the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. Furthermore, in the example of FIG. 1, destination device 14 includes a storage medium 29 and a file parsing unit 31. In some cases, input interface 28 may include a receiver and/or a modem. Input interface 28 of destination device 14 receives the encoded video data over a link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Destination device 14 may receive the encoded video data to be decoded via link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, output interface 22 may output encoded data to a storage device 33. Similarly, input interface 28 may access encoded data storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video data for storage on a data storage medium, decoding of digital video data stored on a data storage medium, or other applications. In some examples, system 10 may be configured to support one-way or two-way video transmission to support applications such as video streaming, video playback, video broadcasting, and/or video telephony.

Furthermore, in the example of FIG. 1, video coding system 10 includes a file generation device 34. File generation device 34 may receive encoded video data generated by source device 12. File generation device 34 may generate a file that includes the encoded video data. Destination device 14 may receive the file generated by file generation device 34. In various examples, file generation device 34 may include various types of computing devices. For instance, file generation device 34 may comprise a video encoding device, a Media Aware Network Element (MANE), a server computing device, a personal computing device, a special-purpose computing device, a commercial computing device, or another type of computing device. In some examples, file generation device 34 is part of a content delivery network. File generation device 34 may receive the encoded video data from source device 12 via a channel such as link 16. Furthermore, destination device 14 may receive the file from file generation device 34 via a channel such as link 16. File generation device 34 may be considered a video device. As shown in the example of FIG. 1, file generation device 34 may comprise a memory 31 configured to store a file that contains encoded video contents.

In other examples, source device 12 or another computing device may generate a file that includes the encoded video data. However, for ease of explanation, this disclosure describes file generation device 34 as generating the file. Nevertheless, it should be understood that such descriptions are applicable to computing devices in general.

Video encoder 20 and video decoder 30 may operate according to a video compression standard, such as the High Efficiency Video Coding (HEVC) standard or an extension thereof. The HEVC standard may also be referred to as ISO/IEC 23008-2. Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip. The multiview extension to HEVC, namely MV-HEVC, has also been developed by the JCT-3V. A recent Working Draft (WD) of MV-HEVC, titled "MV-HEVC Draft Text 5" and referred to as MV-HEVC WD5 hereinafter, is available from http://phenix.it-sudparis.eu/jct2/doc_end_user/documents/5_Vienna/wg11/JCT3V-E1004-v6.zip. The scalable extension to HEVC, named SHVC, has also been developed by the JCT-VC. A recent Working Draft (WD) of SHVC, titled "High efficiency video coding (HEVC) scalable extension draft 3" and referred to as SHVC WD3 hereinafter, is available from http://phenix.it-sudparis.eu/jct/doc_end_user/documents/14_Vienna/wg11/JCTVC-N1008-v3.zip. A recent working draft (WD) of the range extension of HEVC, is available from available from http://phenix.int-evry.fr/jct/doc_end_user/documents/14_Vienna/wg11/JCTVC-N1005-v3.zip. A recent working draft (WD) of the 3D extension of HEVC, namely 3D-HEVC, titled "3D-HEVC Draft Text 1" is available from http://phenix.int-evry.fr/jct2/doc_end_user/documents/5_Vienna/wg11/JCT3V-E1001-v3.zip. Video encoder 20 and video decoder 30 may operate according to one or more of these standards or other standards. Such other video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In general, in HEVC, a video frame or picture may be divided into a sequence of treeblocks or largest coding units (LCU) that include both luma and chroma samples. Treeblocks may also be referred to as Coding Tree Units (CTUs). A treeblock has a similar purpose as a macroblock of the H.264/AVC standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, or other types of parameter sets) may be referred to as parameter set NAL units.

This disclosure may refer to a NAL unit that encapsulates an RBSP for a segment slice as a coded slice NAL unit. As defined in the HEVC WD, a slice segment is an integer number of CTUs ordered consecutively in tile scan and contained in a single NAL unit. In contrast, in the HEVC WD, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

File formats and file format standards will now be briefly discussed. File format standards include the ISO base media file format (ISOBMFF, ISO/IEC 14496-12, hereinafter, "ISO/IEC 14996-12") and other file format standards derived from ISOBMFF, including MPEG-4 file format (ISO/IEC 14496-14), 3GPP file format (3GPP TS 26.244) and AVC file format (ISO/IEC 14496-15, hereinafter "ISO/IEC 14996-15"). Thus, ISO/IEC 14496-12 specifies the ISO base media file format. Other documents extend the ISO base media file format for specific applications. For instance, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format. The discussion below is based on the recently integrated version of 14496-12, embedded in N14574.

ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, ISOBMFF has proven valuable for streaming, e.g., for progressive download or DASH. For streaming purposes, movie fragments defined in ISOBMFF can be used. In addition to continuous media, such as audio and video, static media, such as images, as well as metadata can be stored in a file conforming to ISOBMFF.

A file conforming to the HEVC file format may comprise a series of objects, called boxes. A box may be an object-oriented building block defined by a unique type identifier and length. A box is the elementary syntax structure in ISOBMFF and may include a four-character coded box type, a byte count of the box, and a payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes. FIG. 6A, FIG. 6B, FIG. 6C, FIG. 7A, FIG. 7B, and FIG. 7C, described in detail elsewhere in this disclosure, show example boxes within a file, in accordance with one or more techniques of this disclosure.

A file conforming to ISOBMFF may include various types of boxes. For example, a file conforming to ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

ISOBMFF enables specifying sample-specific metadata with various mechanisms. Specific boxes within the Sample Table box ("stbl") have been standardized to respond to common needs. The Sample Table box contains a sample table that contains all the time and data indexing of the media samples in a track. Using the tables in the Sample Table box, it may be possible to locate samples in time, determine their type (e.g. I-frame or not), and determine their size, container, and offset into that container.

For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in ISOBMFF.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14996-12 specification and comprises metadata for one or more track fragments. For instance, a track fragment box may include a track fragment header box indicating a track ID, a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). In some instances, in this disclosure, an element of a box may also be referred to as a syntax element. The grouping type element may be an integer that identifies a type (i.e., a criterion used to form the sample groups) of a sample grouping. Furthermore, a SampleToGroup box may include one or more entries (i.e., sample group entries). Each sample group entry in a SampleToGroup box may be associated with a different, non-overlapping series of consecutive samples in the track. Each sample group entry may indicate a sample count element (e.g., sample_count) and a group description index element (e.g., group_description_index). The sample count element of a sample group entry may indicate a number of samples associated with the sample group entry. In other words, the sample count element of the sample group entry may be an integer that gives the number of consecutive samples with the same sample group descriptor. The group description index element may identify, within a SampleGroupDescription box, a group description entry that contains a description of the samples associated with the sample group entry. The group_description_index elements of multiple sample group entries may identify the same SampleGroupDescription box.

As indicated briefly above, the SampleToGroup box may also include a grouping type parameter syntax element. The grouping type parameter syntax element may be denoted as grouping_type_parameter. The grouping type parameter syntax element is an indication of a sub-type of the sample grouping. There are three places in ISO/IEC 14496-15 using grouping_type_parameter, the first as part of finalized specification (of the MVC file format), the other two as parts of under-development specifications:

1) In clause B.5 (View priority sample grouping) of Wang et al., "Carriage of AVC based 3D video excluding MVC, ISO/IEC JTC1/SC29/WG11/N14837, October 2014, (Text of 14496-15 2014 PDAM 2 AVC based 3D video excluding MVC), hereinafter, N14837, and earlier versions of 14496-15 that has the MVC file format in it:

If version 1 of the Sample to Group Box is used and the MVC View Priority Assignment URI box is present in the sample entry, grouping type_parameter is a 1-based index to the MVC View Priority Assignment URI box.

2) In clause 7.2.6 (Sample groups on random access recovery points and random access points) of N14837 (Text of 14496-15 2014 PDAM 2 AVC based 3D video excluding MVC):

When version 1 of the SampleToGroupBox is used for the random access point sample grouping, the grouping type_parameter specifies the tier id value of the layer(s) or view(s) that are refreshed in the associated sample.

3) In clause 10.6 (Stream access point sample group) of N14574 (ISO/IEC 14496-12 Amd.4 Improved audio support):

A stream access point, as defined in Annex I, enables random access into a container of media stream(s). The SAP sample grouping identifies samples (the first byte of which is the position $I_{SAU}$ for a SAP as specified in Annex I) as being of the indicated SAP type.

The syntax and semantics of grouping_type_parameter are specified as follows.

```
{
    unsigned int(28) target_layers;
    unsigned int(4) layer_id_method_idc;
}
target_layers specifies the target layers for the indicated
    SAPs according to Annex I. The semantics of
    target_layers depends on the value of
    layer_id_method_idc. When layer_id_method_idc
    is equal to 0, target_layers is reserved.
layer_id_method_idc specifies the semantics of
    target_layers. layer_id_method_idc equal to 0
    specifies that the target layers consist of all the layers
    represented by the track. layer_id_method_idc not
equal
    to 0 is specified by derived media format specifications.
. . .
```

There are also some instances in the latest 14496-12 text that use the grouping_type_parameter syntax element. For instance, clause 8.8.13.1 Level Assignment Box and clause 8.8.16.1 Alternative Startup Sequence Properties Box use the grouping_type_parameter syntax element.

Some aspects of the current signaling of sample groups in ISOBMFF (i.e., the SampleGroupDescription box and SampleToGroup box) are not clear or not working when the version of the SampleToGroup boxes is equal to 1. For instance, the syntax of the Sample to Group box is as follows:

```
aligned(8) class SampleToGroupBox
    extends FullBox('sbgp', version, 0)
{
    unsigned int(32)   grouping_type;
    if (version == 1) {
        unsigned int(32)  grouping_type_parameter;
    }
    unsigned int(32) entry_count;
    for (i=1; i <= entry_count; i++)
    {
        unsigned int(32)   sample_count;
        unsigned int(32)   group_description_index;
    }
}
```

The semantics of grouping_type and grouping_type_parameter are as follows:

grouping_type is an integer that identifies the type (i.e. criterion used to form the sample groups) of the sample grouping and links it to its sample group description table with the same value for grouping type. At most one occurrence of this box with the same value for grouping_type (and, if used, grouping_type_parameter) shall exist for a track.

grouping_type_parameter is an indication of the sub-type of the grouping

Therefore, the grouping type of a version 1 sample group may consist of both grouping_type and grouping_type_parameter.

Furthermore, there is the following description of the SampleToGroup box in the 14496-12 specification:

> There may be multiple instances of this box if there is more than one sample grouping for the samples in a track. Each instance of the SampleToGroup box has a type code that distinguishes different sample groupings. [START 1]
> Within a track, there shall be at most one instance of this box with a particular grouping_type. [END 1][START 2] The associated SampleGroupDescription shall indicate the same value for the grouping type. [END 2]

In this description of the SampleToGroup box, the type code is actually just grouping_type, not including the sub-type grouping_type_parameter. While on the other hand, based on the text between [START 1] and [END 1] above, the grouping type consists of both grouping_type and grouping_type_parameter. While again, based on the text between [START 2] and [END 2] above, the grouping_type again consists only of grouping_type.

The syntax of the Sample Group Description box is as follows:

```
aligned(8) class SampleGroupDescriptionBox (unsigned
int(32) handler_type)
    extends FullBox('sgpd', version, 0){
    unsigned int(32) grouping_type;
    if (version==1) { unsigned int(32) default_length; }
    if (version>=2) {
        unsigned int(32)
default_sample_description_index;
    }
    unsigned int(32) entry_count;
    int i;
    for (i = 1 ; i <= entry_count ; i++){
        if (version==1) {
            if (default_length==0) {
                unsigned int(32) description_length;
            }
        }
        SampleGroupEntry (grouping_type);
            // an instance of a class derived from
SampleGroupEntry
            //  that is appropriate and permitted for
the media type
    }
}
```

As can be seen, no sample grouping sub-type (i.e., grouping_type_parameter) exists in the SampleGroupDescription box. Thus, there is no way to have multiple SampleGroupDescription boxes in a Sample Table box or a Track Fragment box with the same value of grouping_type (and different values of grouping_type_parameter) such that there is a one-to-one mapping between SampleToGroup boxes and SampleGroupDescription boxes when sub-grouping is used with version 1 SampleToGroup boxes.

Furthermore, there is the following description of the Sample Description box in the 14496-12 specification:

> There may be multiple instances of this box if there is more than one sample grouping for the samples in a track. Each instance of the SampleGroupDescription box has a type code that distinguishes different sample groupings. Within a track, there shall be at most one instance of this box with a particular grouping_type. The associated SampleToGroup shall indicate the same value for the grouping_type.

From this text, both the type code and the grouping_type should just be grouping_type, not including the sub-type grouping_type_parameter.

A summary description of the techniques of this disclosure is given below, with a detailed implementation of some methods provided in later sections. Some of these techniques may be applied independently and some of them may be applied in combination. Particular techniques of this disclosure prescribe requirements to which files belonging to a file format must conform. For instance, if a file does not satisfy one of the requirements, the file does not conform to the file format.

In accordance with a first example technique of this disclosure, the clarity issues regarding the signaling of sample groups in ISOBNIFF described above may be addressed by removing the grouping_type_parameter syntax element from the Sample to Group box syntax. Thus, the grouping_type syntax element may be the sole syntax element indicating the grouping_type of a Sample to Group box.

In accordance with a second example technique of this disclosure, the clarity issues regarding the signaling of sample groups in ISOBNIFF described above may be addressed by adding a grouping_type_parameter syntax element to the syntax of the Sample Group Description box when the version of the Sample Group Description box is 1. With this example, there is a one-to-one relationship between Sample Group Description boxes and Sample to Group boxes such that Sample Group Description boxes and Sample to Group boxes can be matched by the value of the grouping_type syntax element and the grouping_type_parameter syntax element, if present. For example, the syntax of the Sample Group Description box may be modified such that the Sample Group Description box may include a grouping_type_parameter syntax element. In this example, a Sample to Group box may correspond to a Sample Group Description box if the value of the grouping_type syntax element of the Sample to Group box matches the value of the grouping_type syntax element of the Sample Group Description box and the value of the grouping_type_parameter syntax element of the Sample to Group box matches the value of the grouping_type_parameter syntax element of the Group Description box.

In accordance with a third example technique of this disclosure, the clarity issues regarding the signaling of sample group groups in ISOBMFF described above may be addressed by defining that the relationship between SampleGroupDescription box and SampleToGroup box for the same grouping_type is 1 to N. In accordance with this third example technique, one or more of the following may apply. Firstly, within a container box (e.g., 'stbl' or 'traf') there shall be only one SampleGroupDescription box with a particular value of grouping_type and there can be one or more associated (e.g., corresponding) SampleToGroup boxes with the same value of grouping_type. For example, the value of a grouping_type syntax element in a SampleGroupDescription box may be equal to 3 and the values of grouping_type syntax elements in multiple SampleToGroup boxes may have values equal to 3. In some examples, the container box may include multiple SampleGroupDescription boxes. In at least some such examples, no two of the multiple SampleGroupDescription boxes are permitted to have grouping_type syntax elements having the same value.

Secondly, in the third example technique of this disclosure, when there are multiple SampleToGroup boxes with a particular value of the grouping_type syntax element in a container box, the version of all the SampleToGroup boxes must be 1. For instance, in this example, if two SampleToGroup boxes in a container box have grouping_type syntax elements with values equal to 3, it is not possible to have one of the SampleToGroup boxes be a version 0 SampleToGroup box. Rather, in this example, both of the two SampleToGroup boxes are version 1 SampleToGroup boxes. Therefore, in this example, both of the two SampleToGroup boxes have grouping_type_parameter syntax elements. Thus, it may be a requirement of a file format that when there are multiple SampleToGroup boxes with the same value of the grouping_type syntax element in a single container box, each of the multiple SampleToGroup boxes must have a respective version identifier equal to 1.

Thirdly, in this third example technique of this disclosure, when there are multiple SampleToGroup boxes with a particular value of the grouping_type syntax element, the value of the grouping_type syntax element should be constrained such that any value of the group_description_index syntax element that is greater than 0 shall not be present in more than one of the SampleToGroup boxes. In other words, there is a restriction or prohibition built into the file format that prevent two or more SampleToGroup boxes in the same container box from having group_description_index syntax elements with the same value greater than 0. For example, a first SampleToGroup box and a second SampleToGroup box may each have a grouping_type syntax element with a value equal to 4. In this example, if the first SampleToGroup box has a group_description_index syntax element with a value equal to 2, the second SampleToGroup box may not have a group_description_index syntax element with a value equal to 2. Thus, in this example, it may be a requirement of the file format that when there are multiple SampleToGroup boxes with the same value of the grouping_type syntax element in a single container box, no two of the multiple SampleToGroup boxes shall have group description index syntax elements having the same value greater than 0.

Thus, in accordance with an example of the third technique of this disclosure, a device, such as source device 12 or file generation device 34, may generate a container box (e.g., a sample table box or a track fragment box) of the file such that the file conforms to a particular file format. As part of generating the container box, the device may generate, in the container box, a SampleGroupDescription box that includes one or more group description entries. Each respective group description entry provides a description for a respective sample group. The SampleGroupDescription box further includes a grouping type syntax element that identifies a type of sample grouping. In this example, the grouping type syntax element in the SampleGroupDescription box has a particular value. Furthermore, in this example, the device may generate, in the same container box of the file, a plurality of SampleToGroup boxes. In this example, each respective SampleToGroup box of the plurality of SampleToGroup boxes includes a respective grouping type syntax element having the particular value. Additionally, each respective SampleToGroup box includes one or more sample group entries. Each respective sample group entry of the one or more sample group entries comprises a respective sample count syntax element indicating a number of samples in a respective sample group. Each respective sample group entry of the one or more sample group entries comprises a respective group description index syntax element indicating an index of a group description entry in the SampleGroupDescription box that provides a description of the respective sample group. Each sample of the respective sample group comprises one or more pictures of the video content. In this example, the device may output the file.

A device for reading a file, such as destination device 14 may obtain the file and obtain, e.g., by parsing the file, the container box from the file. For instance, in the example of FIG. 1, storage medium 29 of destination device 14 may be configured to store the file. File parsing unit 31 of destination device 14 may be configured to obtain the container box from the file. In this example, video decoder 30 may decode encoded video data parsed from the file.

In accordance with the third example technique of this disclosure, it may be a requirement of the particular file format that there shall only be one SampleGroupDescription box in the container box with the particular value of the grouping type syntax element. However, in some examples, the device may further generate another SampleGroupDescription box having a grouping type syntax element different from the particular value.

As indicated above, the file may conform to a particular file format. Moreover, in some examples, it is a requirement of the file format that when there are multiple SampleToGroup boxes with the same value of the grouping type syntax element in a single container box, each of the multiple SampleToGroup boxes must have a respective version identifier equal to 1. In other words, when there are multiple SampleToGroup boxes with a particular value of grouping_type in a container box, the version of all the SampleToGroup boxes must be 1. Furthermore, in some examples, a requirement of the file format is that when there are multiple SampleToGroup boxes with the same value of the grouping type syntax element in a single container box, no two of the multiple SampleToGroup boxes shall have group description index syntax elements having the same value greater than 0. In other words, when there are multiple SampleToGroup boxes with a particular value of grouping_type, it should be constrained that any value of group_description_index that is greater than 0 shall not be present in more than one of the SampleToGroup boxes. In some examples, it is a requirement of the file format that when there are multiple SampleToGroup boxes with the same value of the grouping type syntax element in a single track or track fragment, no two of the multiple SampleToGroup boxes have the same value of a grouping type parameter syntax element.

The ISOBMFF specification specifies six types of Stream Access Points (SAPs) for use with DASH. The first two SAP types (types 1 and 2), correspond to Instantaneous Decoding Refresh (IDR) pictures in H.264/AVC and HEVC. An IDR picture only includes I slices. I slices are slices that may include intra predicted blocks, but not inter predicted blocks. The third SAP type (type 3) corresponds to open-GOP random access points, i.e., Broken Link Access (BLA) or Clean Random Access (CRA) pictures in HEVC. BLA pictures and CRA pictures may only include I slices. Pictures that follow a CRA picture in decoding order, but precede the CRA picture in output order, may use pictures decoded before the CRA picture for reference. A BLA picture typically originates from bitstream splicing at the position of a CRA picture, and in the spliced bitstream the splicing point CRA picture is changed to a BLA picture. The fourth SAP type (type 4) corresponds to Gradual Decoding Refresh (GDR) random access points. An access unit that is not an Intra Random Access Point (TRAP) access unit and that contains a recovery point SEI message is referred to as a GDR access unit, and its corresponding picture is referred to as a GDR picture.

In the current 14996-12 specification, the design of signaling an SAP sample grouping requires that version 1 of SampleToGroup boxes are used. This design is inefficient because it would typically require the use of multiple SampleToGroup boxes as well as more total entries in the SampleToGroup boxes. This may mean both higher parsing complexity and more data overhead. One reason for the additional data overhead is that the use of extra boxes would consequently result in more overhead for signaling some information such as box type, box version, and so on. Another reason for the additional data overhead is the additional entries in the SampleToGroup boxes, while the data amount of each entry is a constant. More boxes may mean that more parsing is used for finding the boxes. In particular, if there is just one box to be found, then parsing can stop immediately after that box is found, while when there are possibly multiple boxes to be found and the actual number of the boxes is unknown, parsing of the entire container box until the end would be used.

To solve this issue, this disclosure proposes that instead of using version 1 for the SampleToGroup boxes, version 0 is used. The syntax elements target_layers and layers_id_method_idc are included in the sample group description entry.

Figure 2:
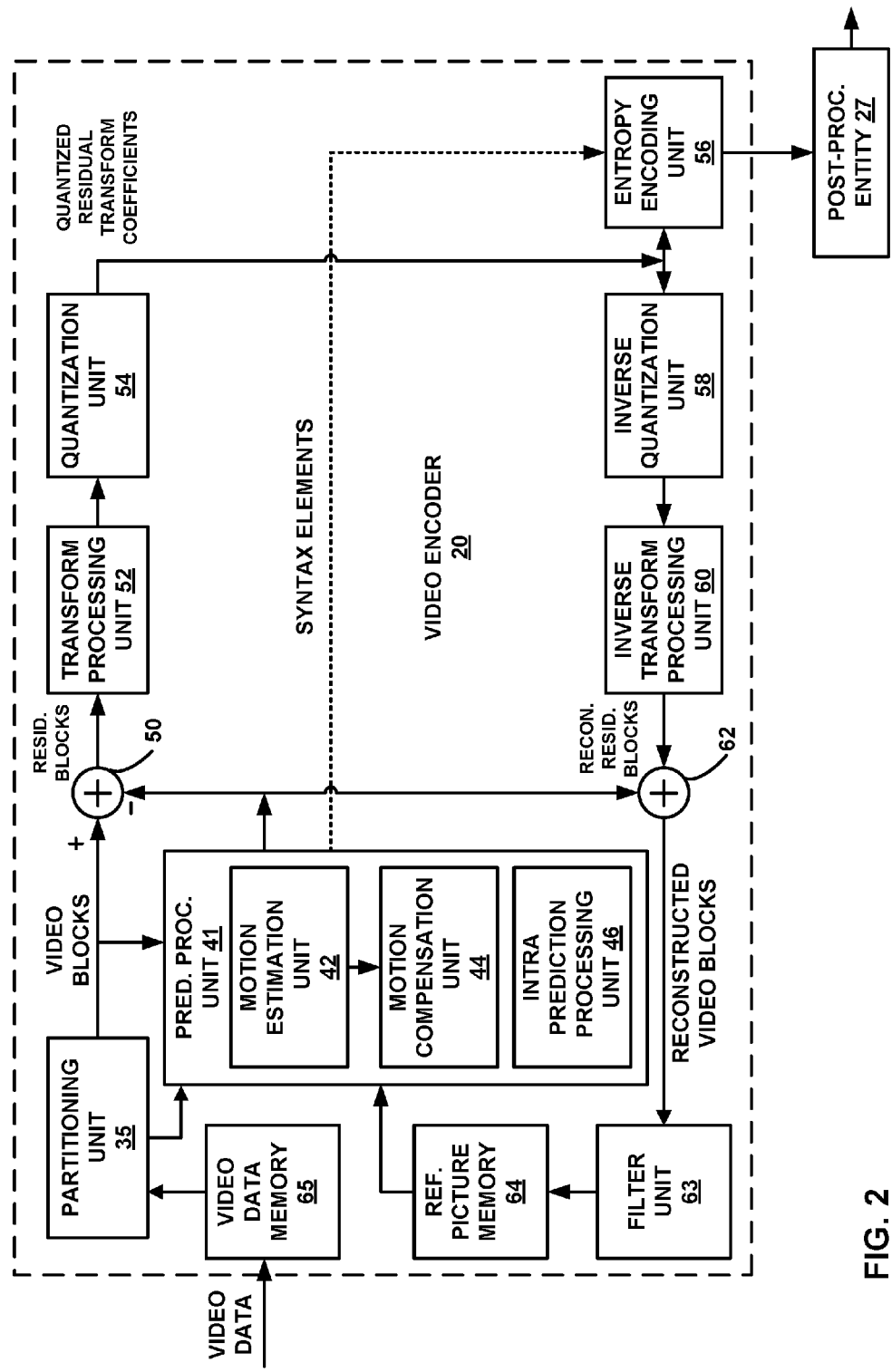
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 represents an example of a video coder configured generate video data that may be stored using the file format techniques described in this disclosure. Video encoder 20 may be configured to output single view, multiview, scalable, 3D, and other types of video data. Video encoder 20 may be configured to output video to post-processing processing entity 27. Post-processing processing entity 27 is intended to represent an example of a video entity, such as a MANE or splicing/editing device, that may process encoded video data from video encoder 20. In some instances, post-processing processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20. Post-processing entity 27 may be a video device. In some examples, post-processing entity 27 may be the same as file generation device 34 of FIG. 1.

In accordance with a technique of this disclosure, post-processing entity 27 may generate a file for storage of encoded video content generated by video encoder 20. The file may include, in a container box of the file, a SampleGroupDescription box that provides a sample group description for a sample grouping. The SampleGroupDescription box includes a grouping type syntax element having a particular value. Additionally, the SampleGroupDescription box includes one or more sample group entries. Post-processing entity 27 may generate, in the same container box, a plurality of SampleToGroup boxes. Each respective SampleToGroup box of the plurality of SampleToGroup boxes includes a respective grouping type syntax element having the particular value, includes a respective sample count syntax element indicating a number of samples in a respective sample grouping, and includes a respective group description index syntax element indicating an index of an entry in the SampleGroupDescription box which describes samples of the respective sample grouping. Each sample of the respective sample grouping may comprise a respective picture of the video contents.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

A video data memory 65 of video encoder 20 may store video data to be encoded by the components of video encoder 20. The video data stored in video data memory 65 may be obtained, for example, from video source 18. Reference picture memory 64 may be a reference picture memory that stores reference video data for use in encoding video data by video encoder 20, e.g., in intra- or inter-coding modes. Video data memory 65 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 65 and reference picture memory 64 may be provided by the same memory device or separate memory devices. In various examples, video data memory 65 may be on-chip with other components of video encoder 20, or off-chip relative to those components.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends syntax elements from which the calculated motion vector can be determined to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 may entropy encode syntax elements representing the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 may add the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
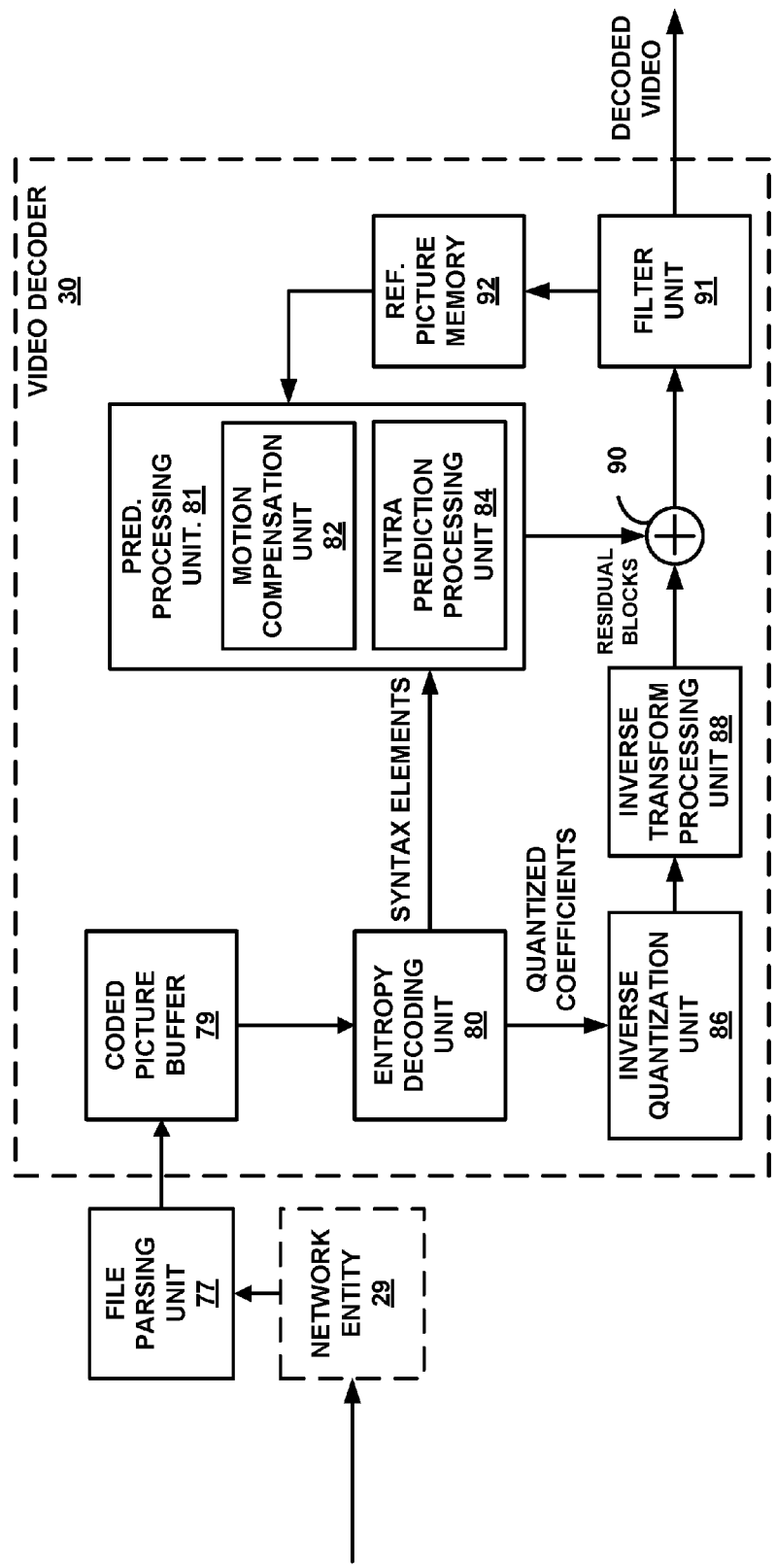
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 of FIG. 3 represents an example of a video decoder configured to decode video data that may be stored using the file format techniques described in this disclosure.

Video decoder 30 may be configured to decode single view, multiview, scalable, 3D, and other types of video data. In the example of FIG. 3, video decoder 30 includes an entropy decoding unit 80, prediction processing unit 81, inverse quantization unit 86, inverse transform processing unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

A coded picture buffer (CPB) 79 may receive and store encoded video data (e.g., NAL units) of a bitstream. The video data stored in CPB 79 may be obtained, for example, from link 16 of FIG. 1, e.g., from a local video source, such as a camera, via wired or wireless network communication of video data, or by accessing physical data storage media. CPB 79 may form a video data memory that stores encoded video data from an encoded video bitstream. Reference picture memory 92 may be a reference picture memory that stores reference video data for use in decoding video data by video decoder 30, e.g., in intra- or inter-coding modes. CPB 79 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 79 and reference picture memory 92 may be provided by the same memory device or separate memory devices. In various examples, CPB 79 may be on-chip with other components of video decoder 30, or off-chip relative to those components.

During the decoding process, video decoder 30 receives an encoded video bitstream that represents video blocks of an encoded video slice and associated syntax elements from video encoder 20. In the example of FIG. 3, video decoder 30 may receive the encoded video bitstream from a file parsing unit 77 that parses a file to extract a coded video bitstream. In some examples, file parsing unit 77 may receive the file from a network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be considered to be a video device. Furthermore, in some examples, network entity 29 is the file generation device 34 of FIG. 1. File parsing unit 77 may be implemented as part of destination device 14 or a device separate from destination device. In some examples, network entity 29 and file parsing unit 77 are implemented by the same device.

Entropy decoding unit 80 of video decoder 30 entropy decodes particular syntax elements of the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by determining the motion vectors and obtaining other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and may use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video data for later presentation on a display device, such as display device 32 of FIG. 1. Thus, reference picture memory 92 may be an example of one or more data storage media configured to store video data.

Figure 4:
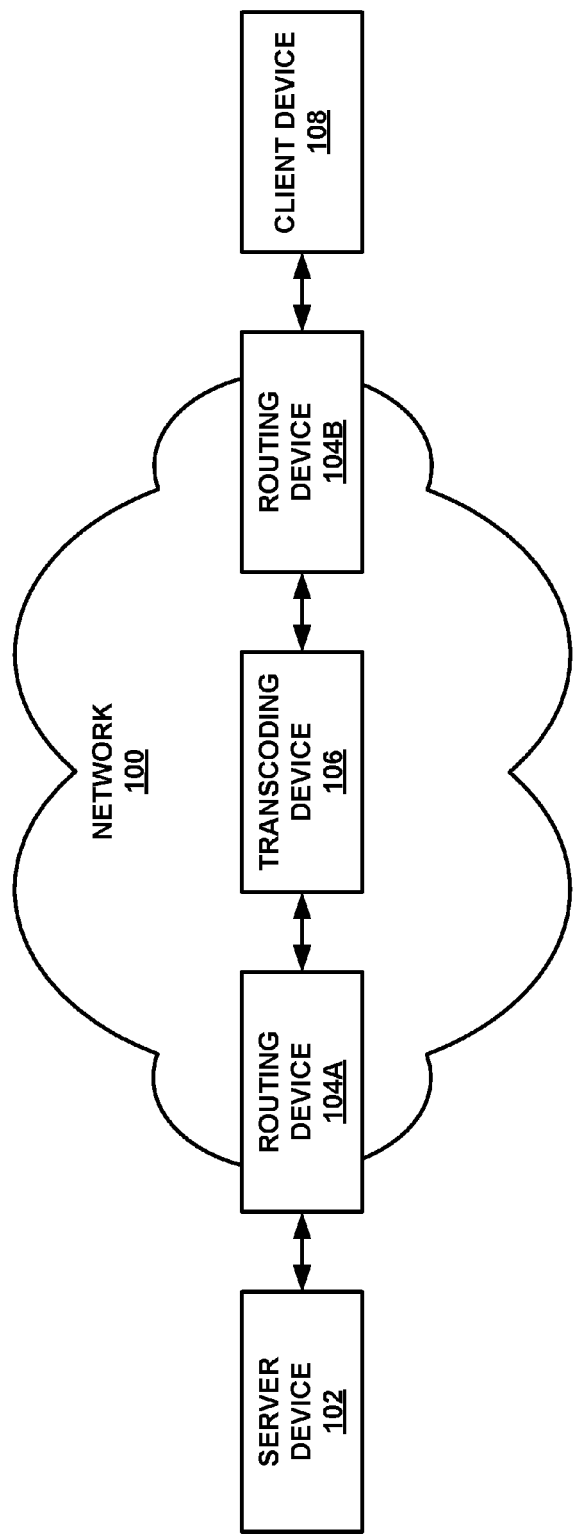
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. In some examples, server device 102 may correspond to source device 12 (FIG. 1), while client device 108 may correspond to destination device 14 (FIG. 1).

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 2 and decoder 30 illustrated in FIG. 3 are also examples of devices that can be configured to perform one or more of the techniques of this disclosure. For example, a file generated in manner described in this disclosure may be transmitted or streamed from server device 102 to client device 108 via network 100, as shown in FIG. 4.

The details of techniques of this disclosure elsewhere in this disclosure are provided in this section. In the following text, changes of the implementations described in 15444-12, text between "<insert>" and "</insert>symbols corresponds to additions or modified existing texts (e.g., <insert>added text</insert>), while removed text is between "<delete>" and "</delete> symbols (e.g., <delete>deleted text</delete>).

As indicated briefly above with regard to the first example technique of this disclosure, the grouping_type_parameter syntax element may be removed from the Sample to Group box syntax, as follows:

```
aligned(8) class SampleToGroupBox
    extends FullBox('sbgp', version, 0)
{
    unsigned int(32)  grouping_type;
    <delete>if (version == 1) {
        unsigned int(32) grouping_type_parameter;
    }</delete>
    unsigned int(32) entry_count;
    for (i=1; i <= entry_count; i++)
    {
        unsigned int(32)  sample_count;
        unsigned int(32)  group_description_index;
    }
}
```

In this example, portions of 14496-12 that use the grouping_type_parameter syntax element may be modified to add the information carried in the parameter (not necessarily the syntax element itself) into the sample group description entry.

Furthermore, as indicated briefly above with regard to the second example technique of this disclosure, there may be a one-to-one relationship between Sample Group Description box and Sample to Group box such that they can be matched by the value of the grouping_type syntax and the grouping_type_parameter syntax element, if present. In accordance with this example, the syntax of the SampleGroupDescriptionBox may be modified as follows.

```
aligned(8) class SampleGroupDescriptionBox (unsigned
int(32) handler_type)
        extends FullBox('sgpd', version, 0){
        unsigned int(32) grouping_type;
        if (version==1) {
            unsigned int(32) default_length;
            <insert>unsigned int(32) grouping_type_parameter;
</insert>
        }
        if (version>=2) {
            unsigned int(32)
default_sample_description_index;
        }
        unsigned int(32) entry_count;
        int i;
        for (i = 1 ; i <= entry_count ; i++){
            if (version==1) {
                if (default_length==0) {
                    unsigned int(32) description_length;
                }
            }
            SampleGroupEntry (grouping_type);
            // an instance of a class derived from
SampleGroupEntry
            //  that is appropriate and permitted for
 the media type
        }
}
```

Furthermore, in accordance with techniques of this disclosure where there is a one-to-one relationship between Sample Group Description box and Sample to Group box, the semantics of the grouping_type syntax element and the grouping_type_parameter syntax element in the Sample Group Description box may be modified as follows:

grouping_type is an integer that identifies the grouping<insert>. Together with grouping_type_parameter, if present, it identifies the SampleToGroup box that is associated with this sample group description. grouping_type_parameter is an indication of the sub-type of the grouping. </insert>

The semantics of grouping_type and grouping_type_parameter in the Sample to Group box may be modified as follows:

grouping_type is an integer that identifies the type (i.e. criterion used to form the sample groups) of the sample grouping and links it to its sample group description table with the same value for grouping type <insert>and grouping_type_parameter, if present</insert>. At most one occurrence of this box with the same value for grouping_type (and, if used, grouping_type_parameter) shall exist for a track.

grouping_type_parameter is an indication of the sub-type of the grouping.

Furthermore, in accordance with techniques of this disclosure where there is a one-to-one relationship between Sample Group Description box and Sample to Group box, the description about the quantity of SampleGroupDescription boxes and SampleToGroup boxes may be modified as follows:

SampleGroupDescription box: There may be multiple instances of this box if there is more than one sample grouping for the samples in a track<insert> or track fragment</insert>. Each instance of the SampleGroupDescription box has a type code that distinguishes different sample groupings. Within a track <insert>or track fragment</insert>, there shall be at most one instance of this box with a particular grouping type<insert> and sub-type, if present</insert>. <insert>The associated SampleToGroup shall indicate the same value for the grouping type and sub-type, if present, and shall indicate the same value of version.</insert>

SampleToGroup box: There may be multiple instances of this box if there is more than one sample grouping for the samples in a track <insert> or track fragment</insert>. Each instance of the SampleToGroup box has a type code that distinguishes different sample groupings. Within a track <insert> or track fragment</insert>, there shall be at most one instance of this box with a particular grouping type <insert> and sub-type, if present</insert>. <insert>The associated SampleGroupDescription shall indicate the same value for the grouping type and sub-type, if present, and shall indicate the same value of version.</insert>

As indicated above, in accordance with the third technique of this disclosure, the relationship between SampleGroupDescription boxes and SampleToGroup boxes for the same grouping type is 1 to N. In accordance with such techniques, one or more of the following constraints or aspects may apply. First, within a container box (e.g., 'stbl' or 'traf') there shall be only one SampleGroupDescription box with a particular value of grouping_type and there can be one or more associated SampleToGroup boxes with the same value of grouping_type. Second, when there are multiple SampleToGroup boxes with a particular value of grouping_type in a container box, the version of all the SampleToGroup boxes must be 1. For example, if there are exactly three SampleToGroup boxes in a container box and the values of the grouping_type syntax elements in these three SampleToGroup boxes are each equal to 5, each of the SampleToGroup boxes must be version 1 SampleToGroup boxes, and therefore include grouping_type_parameter syntax elements. Third, when there are multiple SampleToGroup boxes with a particular value of grouping_type, the file is constrained such that any value of the group_description_index syntax element that is greater than 0 shall not be present in more than one of the SampleToGroup boxes. For example, if there are exactly three SampleToGroup boxes in a container box and each of these three SampleToGroup boxes has a grouping_type syntax element with a value equal to 5, no two of the SampleToGroup boxes are allowed to have group_description_index syntax elements with the same value, unless that value is 0. For instance, no two of the SampleToGroup boxes are allowed to have group_description_index syntax elements with values equal to 6.

Furthermore, in accordance with techniques of this disclosure where the relationship between SampleGroupDescription boxes and SampleToGroup boxes for the same grouping type is 1 to N, the description about the quantity of SampleToGroup boxes in the 15444-12 specification may be modified as follows:

There may be multiple instances of this box if there is more than one sample grouping for the samples in a track <insert>or track fragment</insert>. Each instance of the SampleToGroup box has a type code that distinguishes different sample groupings. Within a track <insert>or track fragment</insert>, there shall be at most one instance of this box with a particular grouping type <insert>and sub-type, if present</insert>. <insert>The associated SampleGroupDescription shall indicate the same value for the grouping type and sub-type, if present. </insert>

Additionally, the semantics of the grouping_type syntax element in SampleGroupDescription box may be modified as follows:

grouping_type is an integer that identifies the SampleToGroup box that is associated with this sample group description. If grouping_type_parameter is not defined <insert>in the SampleToGroup box</insert> for a given grouping_type, then there shall be only one occurrence of <insert>SampleToGroup</insert><delete>this</delete> box with this grouping_type <insert>in a container box</insert>.

In accordance with techniques of this disclosure where the relationship between SampleGroupDescription boxes and SampleToGroup boxes for the same grouping type is 1 to N, the semantics of the group_description_index syntax element in the SampleToGroup box may be modified as follows to ensure that when there are multiple SampleToGroup boxes with a particular value of grouping_type, the file is constrained such that any value of the group_description_index syntax element that is greater than 0 shall not be present in more than one of the SampleToGroup boxes:

group_description_index is an integer that gives the index of the sample group entry which describes the samples in this group. The index ranges from 1 to the number of sample group entries in the SampleGroupDescription Box, or takes the value 0 to indicate that this sample is a member of no group of this type. <insert>When the version of this box is equal to 1, if a particular value of group_description_index is present in this SampleToGroup box, the same value of group_description_index shall not be present in any other SampleToGroup box with the same value of grouping_type in the same container box.</insert>

As indicated briefly above, the current design of signaling SAP sample grouping requires that version 1 of SampleTo-Group boxes are used. To overcome issues caused by requiring version 1 of SampleToGroup boxes being used for signaling SAP sample groupings, a device, such as source device 12 or file generation device 34, may use version 0 of SampleToGroup boxes and include target_layers and layers_id_method_idc syntax elements in sample to group description entries. Thus, the device may use the changed design for the 'sap' sample group design regardless of which of the three previously-described techniques of this disclosure are to be taken for the general sample grouping mechanism in 14496-12.

In 14496-12 specification, the syntax and semantics of grouping_type_parameter are specified as follows.

```
{
    unsigned int(28) target_layers;
    unsigned int(4)layer_id_method_idc;
}
```

In the text above, target_layers specifies the target layers for the indicated SAPs according to Annex I of the 14496-12 specification. The semantics of target_layers depends on the value of layer_id_method_idc. When layer_id_method_idc is equal to 0, target_layers is reserved. The layer_id_method_idc syntax element specifies the semantics of the target_layers syntax element. In this example, layer_id_method_idc equal to 0 specifies that the target layers consist of all the layers represented by the track corresponding to the Track box or Track Fragment box containing the SampleToGroup box. layer_id_method_idc not equal to 0 is specified by derived media format specifications.

As indicated above, the SampleGroupDescription box may include a series of sample group description entries. A specialized version of the sample group description entry may be used for SAPs. In the 14496-12 specification, the syntax and semantics of such a sample group description entry are as follows:

```
class SAPEntry( ) extends SampleGroupDescriptionEntry
('sap')
{
    unsigned int(4) reserved;
    unsigned int(1) dependent_flag;
    unsigned int(3) SAP_type;
}
```

In SAPEntry( ), the reserved syntax element shall be equal to 0. Devices parsing the file shall allow and ignore all values of reserved. The dependent_flag syntax element shall be 0 for non-layered media. The dependent_flag syntax element equal to 1 specifies that the reference layers, if any, for predicting the target layers may have to be decoded for accessing a sample of this sample group. The dependent_flag syntax element equal to 0 specifies that the reference layers, if any, for predicting the target layers need not be decoded for accessing any SAP of this sample group.

The sap_type syntax element with values equal to 0 and 7 are reserved. Values of the sap_type syntax element in the range of 1 to 6, inclusive, specify the SAP type, as specified in Annex I, of the associated samples (for which the first byte of a sample in this group is the position $I_{SAU}$).

In accordance with a technique of this disclosure, the following modifications are made to the 14496-12 specification to address the issues with signaling SAP sample grouping.

```
class SAPEntry( ) extends SampleGroupDescriptionEntry
('sap')
{
    unsigned int(4) reserved;
    unsigned int(1) dependent_flag;
    unsigned int(3) SAP_type;
    <insert>unsigned int (28) target_layers;
    unsigned int(4)layer_id_method_idc;</insert>
}
```

In this example, the semantics of the reserved syntax element, the dependent_flag syntax element, the SAP_type syntax element, the target_layers syntax element, and the layer_id_method_idc syntax element remain the same. Furthermore, with the above design modification, there is exactly one SampleToGroup box and exactly one SampleGroupDescription box with grouping_type 'sap' in a container box.

Figure 5:
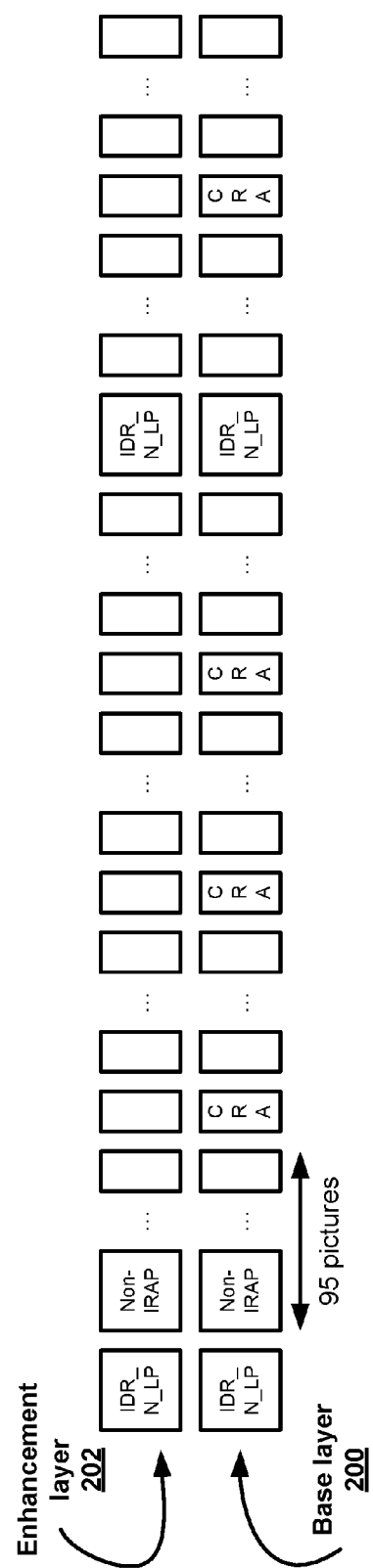
FIG. 5 is a conceptual diagram of two different stream access point (SAP) sample types in a sequence of samples in a track.

In the following text compares the first, second, and third example techniques of this disclosure using the 'sap' sample grouping as an example. FIG. 5 is a conceptual diagram of two different stream access point (SAP) sample types in a sequence of samples in a track. For instance, consider the following example scenario as shown in FIG. 5, which illustrates a sequence of samples in a track and the SAP pictures in the samples are signaled using the 'sap' sample grouping. Particularly, FIG. 5 shows a base layer 200 and an enhancement layer 202. Base layer 200 includes a series of pictures, starting with an IDR picture, followed by one or more non-IRAP pictures (e.g., 95 non-IRAP pictures). In base layer 200, there are a number of CRA pictures interspersed among the non-IRAP pictures prior to the next IDR picture. Enhancement layer 202 may include IDR pictures in the same access units as the IDR pictures in base layer 200. However, enhancement layer 202 does not necessarily include CRA pictures corresponding to the CRA pictures of base layer 200.

In an example in accordance with the first example technique of this disclosure, one SampleGroupDescription box and one SampleToGroup box with grouping_type 'sap' may be used. The SampleGroupDescription box contains two entries, and the entry count in the SampleToGroup box is 12, as shown below:

```
SampleGroupDescriptionBox ('sgpd', version = 0)
- grouping_type = 'sap '
- entry_count = 2
- Entry #1 - SAPEntry( )
    o dependent_flag = 0
    o SAP_type = 1
    o target_layers = 3
    o layer_id_method_idc = 1
- Entry #2 - SAPEntry( )
    o dependent_flag = 1
    o SAP_type = 3
    o target_layers = 1
    o layer_id_method_idc = 1
SampleToGroupBox ('sbgp', version = 0)
- grouping_type = 'sap '
- entry_count = 12
- Entry #1 - [1 - 1]   //[sample_count -- group_description_index]
- Entry #2 - [95 - 0]
- Entry #3 - [1 - 2]
- Entry #4 - [95 - 0]
- Entry #5 - [1 - 2]
- Entry #6 - [95 - 0]
- Entry #7 - [1 - 2]
- Entry #8 - [95 - 0]
- Entry #9 - [1 - 1]
```

-continued
```
-   Entry #10 - [95 - 0]
-   Entry #11 - [1 - 2]
-   Entry #12 - [95 - 0]
```

In an example in accordance with the second example technique of this disclosure, there may be two SampleGroupDescription boxes and may be two SampleToGroup boxes with grouping_type 'sap'. In this example, each SampleGroupDescription box contains one entry, resulting in two total entries, and the entry count syntax elements in the two SampleToGroup boxes are 4 and 9, respectively, resulting in thirteen total entries in the SampleToGroup boxes, as shown below:

```
SampleGroupDescriptionBox #1('sgpd', version = 0)
-   grouping_type = 'sap '
-   grouping_type_parameter
        o   target_layers = 3
        o   layer_id_method_idc = 1
-   entry_count = 1
-   Entry #1 - SAPEntry( )
        o   dependent_flag = 0
        o   SAP_type = 1
SampleGroupDescriptionBox #2('sgpd', version = 0)
-   grouping_type = 'sap '
-   grouping_type_parameter
        o   target_layers = 1
        o   layer_id_method_idc = 1
-   entry_count = 1
-   Entry #1 - SAPEntry( )
        o   dependent_flag = 0
        o   SAP_type = 3
SampleToGroupBox #1 ('sbgp', version = 0)
-   grouping_type = 'sap '
-   grouping_type_parameter
        o   target_layers = 3
        o   layer_id_method_idc = 1
-   entry_count = 4
-   Entry #1 - [1 - 1]   //[sample_count -- group_description_index]
-   Entry #2 - [383 - 0]
-   Entry #3 - [1 - 1]
-   Entry #4 - [191 - 0]
SampleToGroupBox #2 ('sbgp', version = 0)
-   grouping_type = 'sap '
-   grouping_type_parameter
        o   target_layers = 1
        o   layer_id_method_idc = 1
-   entry_count = 9
-   Entry #1 - [96 - 0]   //[sample_count -- group_description_index]
-   Entry #2 - [1 - 1]
-   Entry #3 - [95 - 0]
-   Entry #4 - [1 - 1]
-   Entry #5 - [95 - 0]
-   Entry #6 - [1 - 1]
-   Entry #7 - [191 - 0]
-   Entry #8 - [1 - 1]
-   Entry #9 - [95 - 0]
```

In an example in accordance with the third example technique of this disclosure, there may be one SampleGroupDescription box and there may be two SampleToGroup boxes with grouping_type 'sap'. In this example, the SampleGroupDescription box contains two entries, and the entry_count syntax elements in the two SampleToGroup boxes are again 4 and 9, respectively, resulting in thirteen total entries in the SampleToGroup boxes, as shown below:

```
SampleGroupDescriptionBox ('sgpd', version = 0)
-   grouping_type = 'sap '
-   entry_count = 2
-   Entry #1 - SAPEntry( )
        o   dependent_flag = 0
        o   SAP_type = 1
-   Entry #2 - SAPEntry( )
        o   dependent_flag = 1
        o   SAP_type = 3
SampleToGroupBox #1 ('sbgp', version = 0)
-   grouping_type = 'sap '
-   grouping_type_parameter
        o   target_layers = 3
        o   layer_id_method_idc = 1
-   entry_count = 4
-   Entry #1 - [1 - 1]   //[sample_count -- group_description_index]
-   Entry #2 - [383 - 0]
-   Entry #3 - [1 - 1]
-   Entry #4 - [191 - 0]
SampleToGroupBox #2 ('sbgp', version = 0)
-   grouping_type = 'sap '
-   grouping_type_parameter
        o   target_layers = 1
        o   layer_id_method_idc = 1
-   entry_count = 12
-   Entry #1 - [96 - 0]   //[sample_count -- group_description_index]
-   Entry #2 - [1 - 2]
-   Entry #3 - [95 - 0]
-   Entry #4 - [1 - 2]
-   Entry #5 - [95 - 0]
-   Entry #6 - [1 - 2]
-   Entry #7 - [191 - 0]
-   Entry #8 - [1 - 2]
-   Entry #9 - [95 - 0]
```

As can be seen from above, the main differences among the options, the example in accordance with the first technique of this disclosure may use the smallest number of (SampleToGroup and SampleGroupDescription) boxes and may use the smallest number of total entries as well.

Figure 6A:
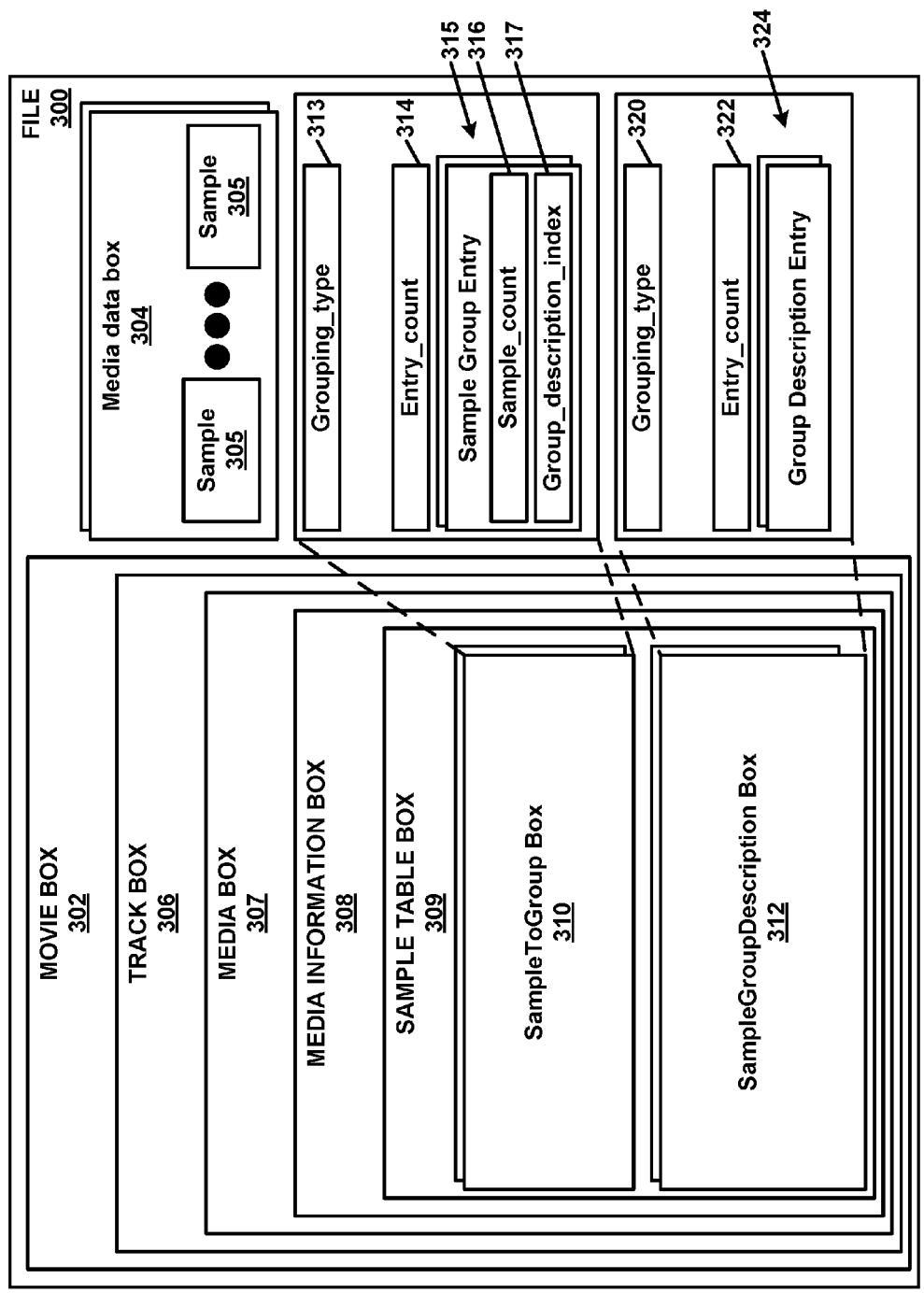
FIG. 6A is a conceptual diagram illustrating an example structure of a file, in accordance with one or more techniques of this disclosure.
Figure 6B:
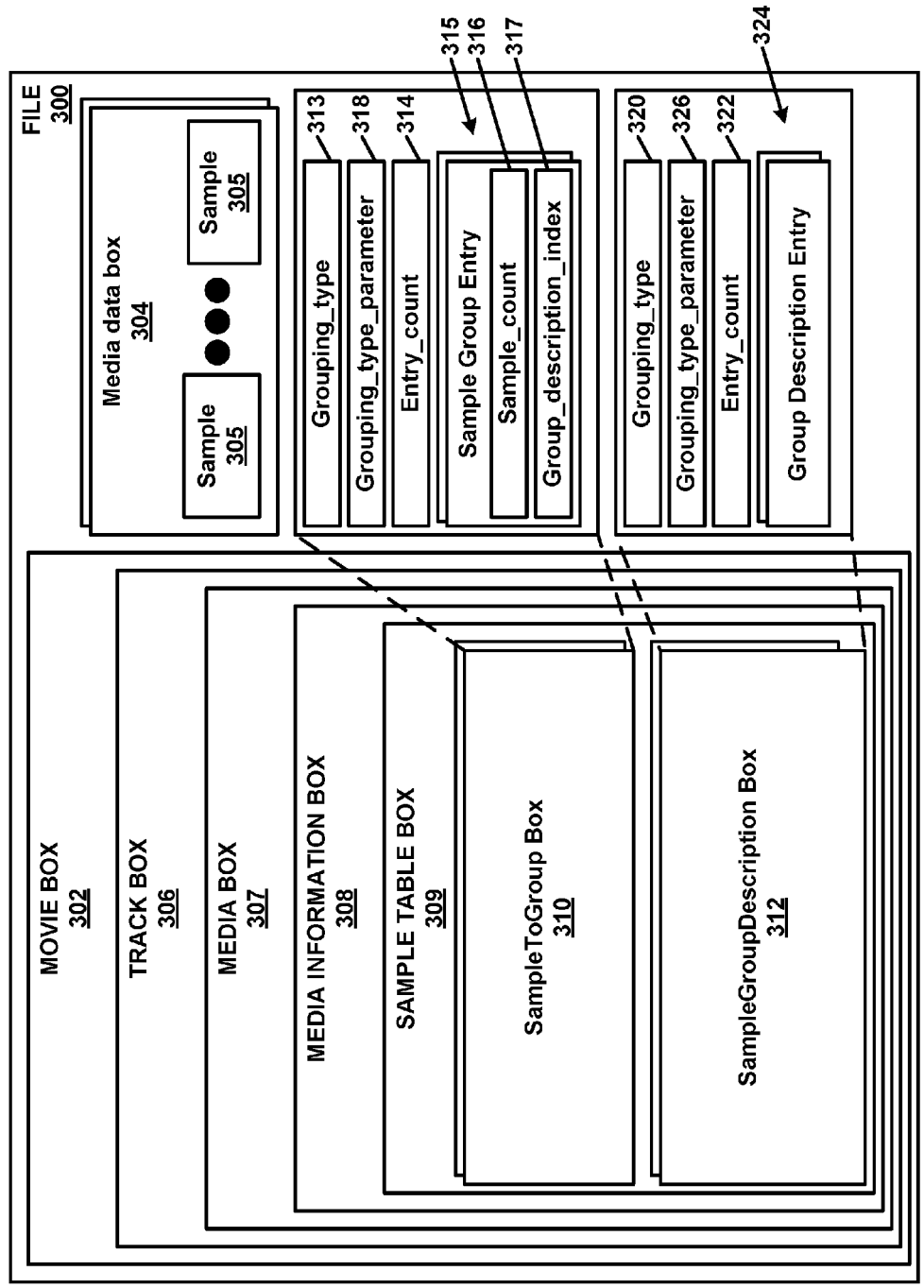
FIG. 6B is a conceptual diagram illustrating an example structure of a file, in accordance with one or more techniques of this disclosure.
Figure 6C:
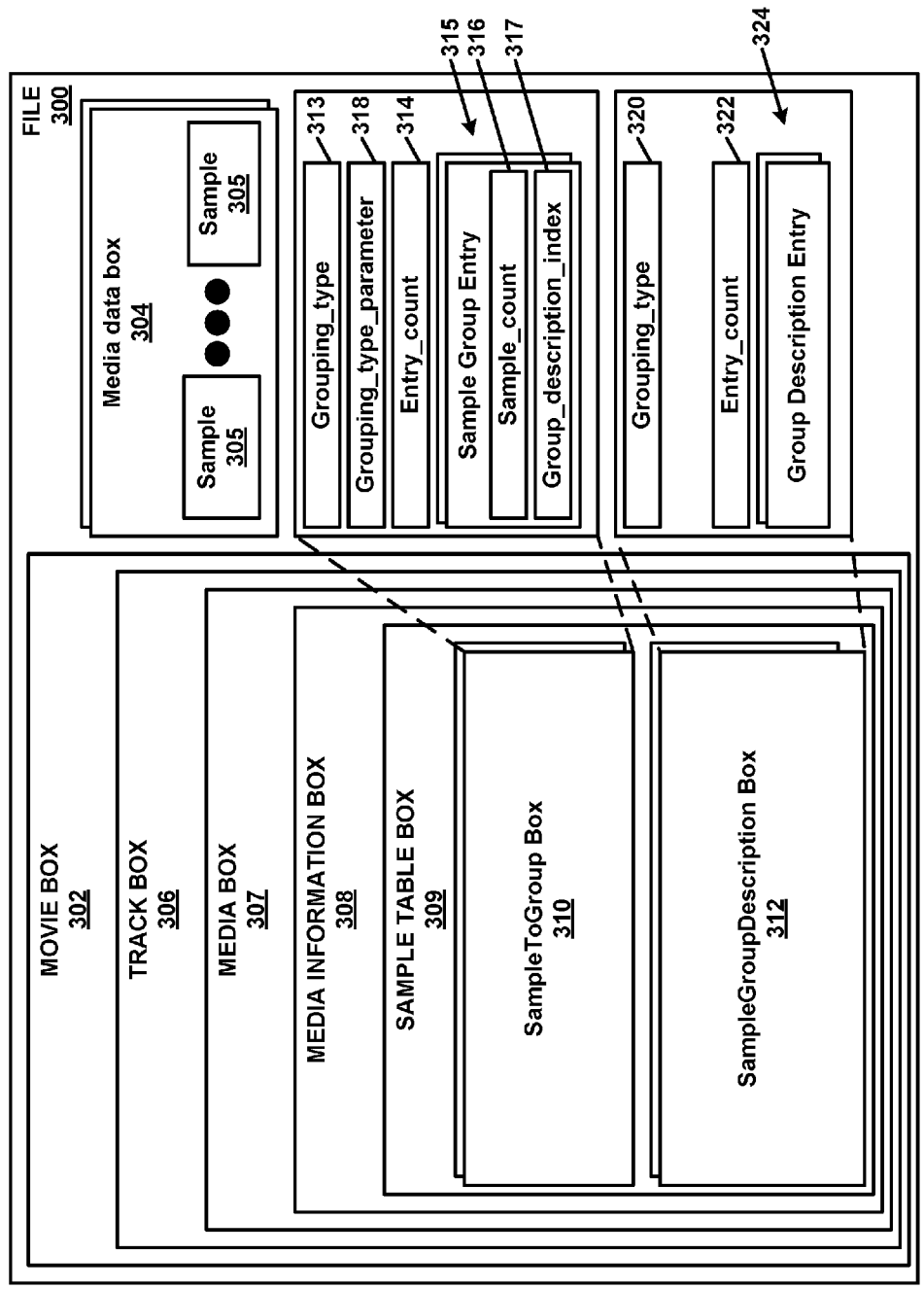
FIG. 6C is a conceptual diagram illustrating an example structure of a file, in accordance with one or more techniques of this disclosure.

FIG. 6A, FIG. 6B, and FIG. 6C are conceptual diagram illustrating examples structure of a file 300, in accordance with one or more techniques of this disclosure. FIG. 6A corresponds to the first example technique of this disclosure discussed above. FIG. 6B corresponds to the second example technique of this disclosure discussed above. FIG. 6C corresponds to the third example technique of this disclosure discussed above.

In the examples of FIG. 6A, FIG. 6B, and FIG. 6C, file 300 includes a Movie box 302 and a plurality of Media Data boxes 304. Although illustrated in the examples of FIG. 6A, FIG. 6B, and FIG. 6C as being in the same file, in other examples Movie box 302 and Media Data boxes 304 may be in separate files. As indicated above, a box may be an object-oriented building block defined by a unique type identifier and length. For instance, a box may be the elementary syntax structure in ISOBMFF, including a four-character coded box type, a byte count of the box, and a payload.

Movie box 302 may contain metadata for tracks of file 300. Each track of file 300 may comprise a continuous stream of media data. Each of Media Data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the examples of FIG. 6A, FIG. 6B, and FIG. 6C, Movie box 302 includes a Track box 306. Track box 306 may enclose metadata for a track of file 300. In other examples, Movie box 302 may include multiple Track boxes for different tracks of file 300. Track box 306 includes a Media box 307. Media box 307 may contain all objects that declare information about the media data within the track. Media box 307 includes a Media Information box 308. Media Information box 308 may contain all objects that declare characteristic information of the media of the track. Media Information box 308 includes a Sample Table box 309. Sample Table box 309 may specify sample-specific metadata.

In the examples of FIG. 6A, FIG. 6B, and FIG. 6C, Sample Table box 309 includes at least one SampleToGroup box 310 and at least one SampleGroupDescription box 312. Thus, Sample Table box 309 is an instance of a "container box." In other examples, Sample Table box 309 may include other boxes in addition to SampleToGroup box 310 and SampleGroupDescription box 312, and/or may include multiple SampleToGroup boxes and SampleGroupDescription boxes. SampleToGroup box 310 may map samples (e.g., particular ones of samples 305) to a group of samples. SampleGroupDescription Box 312 may specify a property shared by the samples in the group of samples (i.e., sample group).

Furthermore, in the examples of FIG. 6A, FIG. 6B, and FIG. 6C, SampleToGroup box 310 includes a grouping_type syntax element 313 (i.e., a grouping type syntax element), an entry_count syntax element 314 (i.e., an entry count syntax element), and one or more sample group entries 315. Entry_count syntax element 314 indicates the number of sample group entries 315. Each of sample group entries 315 includes a sample_count syntax element 316 (i.e., a sample count syntax element) and a group_description_index syntax element 317 (i.e., a group_description_index syntax element). Sample_count syntax element 316 may indicate a number of samples associated with the sample group entry containing sample count syntax element 316. Group_description_index syntax element 317 may identify, within a SampleGroupDescription box (e.g., SampleGroupDescription box 312), a group description entry that contains a description of the samples associated with the sample group entry containing group_description_index syntax element 317.

Additionally, in the examples of FIG. 6A, FIG. 6B, and FIG. 6C, SampleGroupDescription box 312 includes a grouping_type syntax element 320, an entry_count syntax element 322, and one or more group description entries 324. Entry_count syntax element 322 indicates the number of group description entries 324 in the SampleGroupDescription box.

As indicated above, in the first example technique of this disclosure, the clarity issues regarding the signaling of sample groups in ISOBMFF described above may be addressed by removing the grouping_type_parameter syntax element from the Sample to Group box syntax. Thus, in accordance with the first example technique of this disclosure, which is illustrated in FIG. 6A, none of SampleToGroup boxes 310 includes the grouping_type_parameter syntax element (i.e., the grouping_type_parameter syntax element). Thus, in accordance with the first example technique of this disclosure, SampleToGroup box 310 does not include grouping_type_parameter 318 illustrated in FIG. 6B and FIG. 6B, and SampleGroupDescription box 312 does not include grouping_type_parameter 326, as illustrated in FIG. 6B.

As indicated above, in the second example technique of this disclosure, the clarity issues regarding the signaling of sample groups in ISOBMFF described above may be addressed by adding a grouping_type_parameter syntax element to the syntax of the Sample Group Description box when the version of the Sample Group Description box is 1. Thus, in accordance with the second example technique of this disclosure, which is illustrated in FIG. 6B, SampleToGroup boxes 310 and SampleGroupDescription boxes 312 may include grouping_type_parameter syntax elements 318, 326 and there is a 1-to-1 relationship between SampleToGroup boxes 310 and SampleGroupDescription boxes 312.

As indicated above, in the third example technique of this disclosure, the clarity issues regarding the signaling of sample group groups in ISOBMFF described above may be addressed by defining that the relationship between SampleGroupDescription box and SampleToGroup box for the same grouping_type is 1 to N. Thus, in accordance with the third example technique of this disclosure, which is illustrated in FIG. 6C, SampleToGroup box 310 includes grouping_type_parameter syntax element 318 (i.e., a grouping_type_parameter syntax element). Furthermore, there is a 1-to-N relationship between SampleGroupDescription boxes and SampleToGroup boxes having grouping_type syntax elements (e.g., grouping_type syntax elements 313, 320) with the same value. For instance, one of the SampleGroupDescription boxes (e.g., SampleGroupDescription box 312) may have a grouping_type syntax element having a particular value and two or more SampleToGroup boxes may also have grouping_type syntax elements having the particular value. In some examples, if two or more SampleToGroup boxes have grouping_type syntax elements with the same value, each SampleToGroup box in Sample Table box 309 must be version 1. Furthermore, in some examples, if two or more SampleToGroup boxes have grouping_type syntax elements with the same value, any value of the group_description_index syntax element that is greater than 0 shall not be present in more than one of SampleToGroup boxes 310. In accordance with the third example technique of this disclosure, SampleGroupDescription boxes (e.g., SampleGroupDescription box 312) do not include grouping_type_parameter syntax elements (e.g., grouping_type_parameter syntax element 326 shown in FIG. 6B).

Figure 7A:
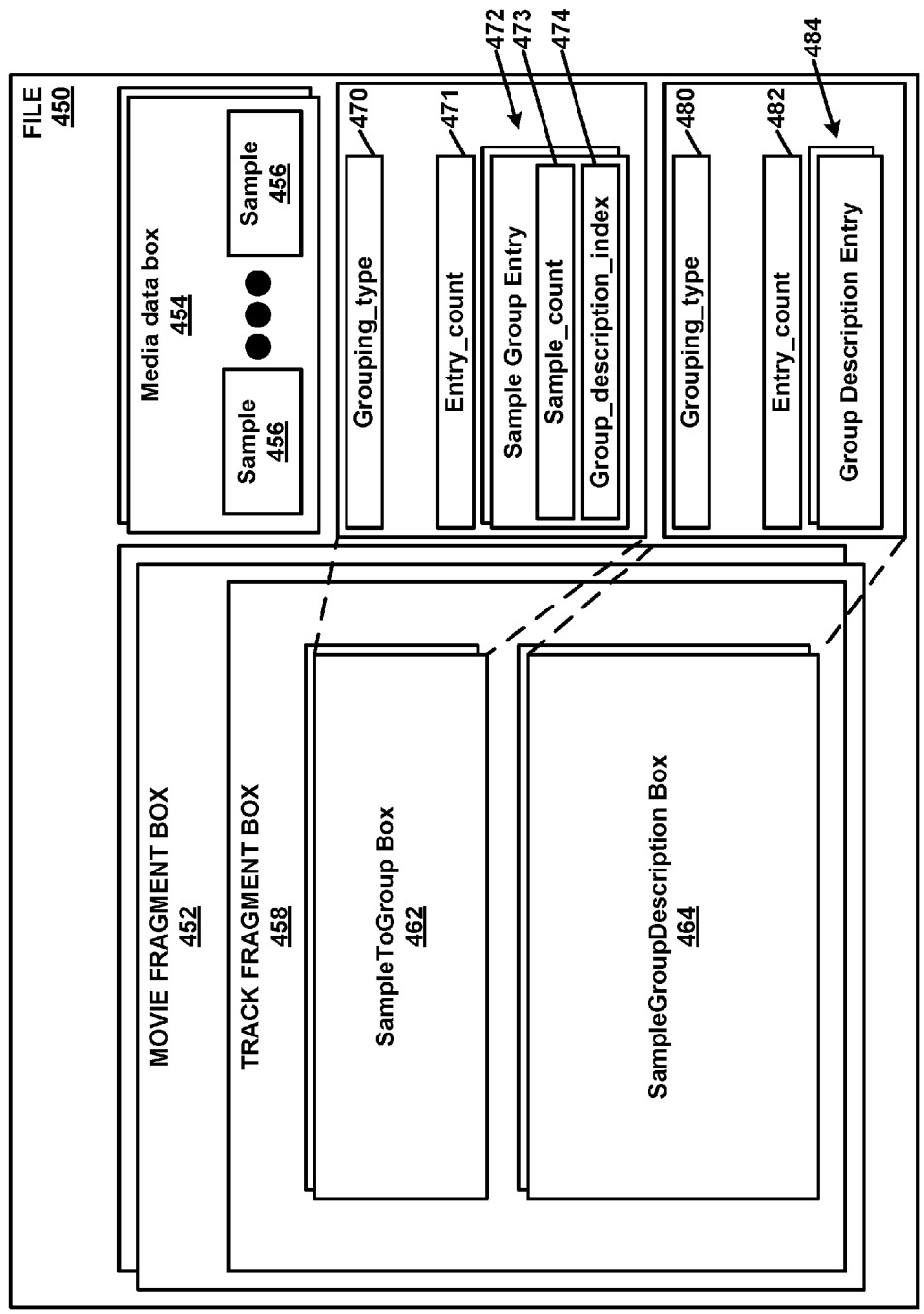
FIG. 7A is a conceptual diagram illustrating an example structure of a file, in accordance with one or more techniques of this disclosure.
Figure 7B:
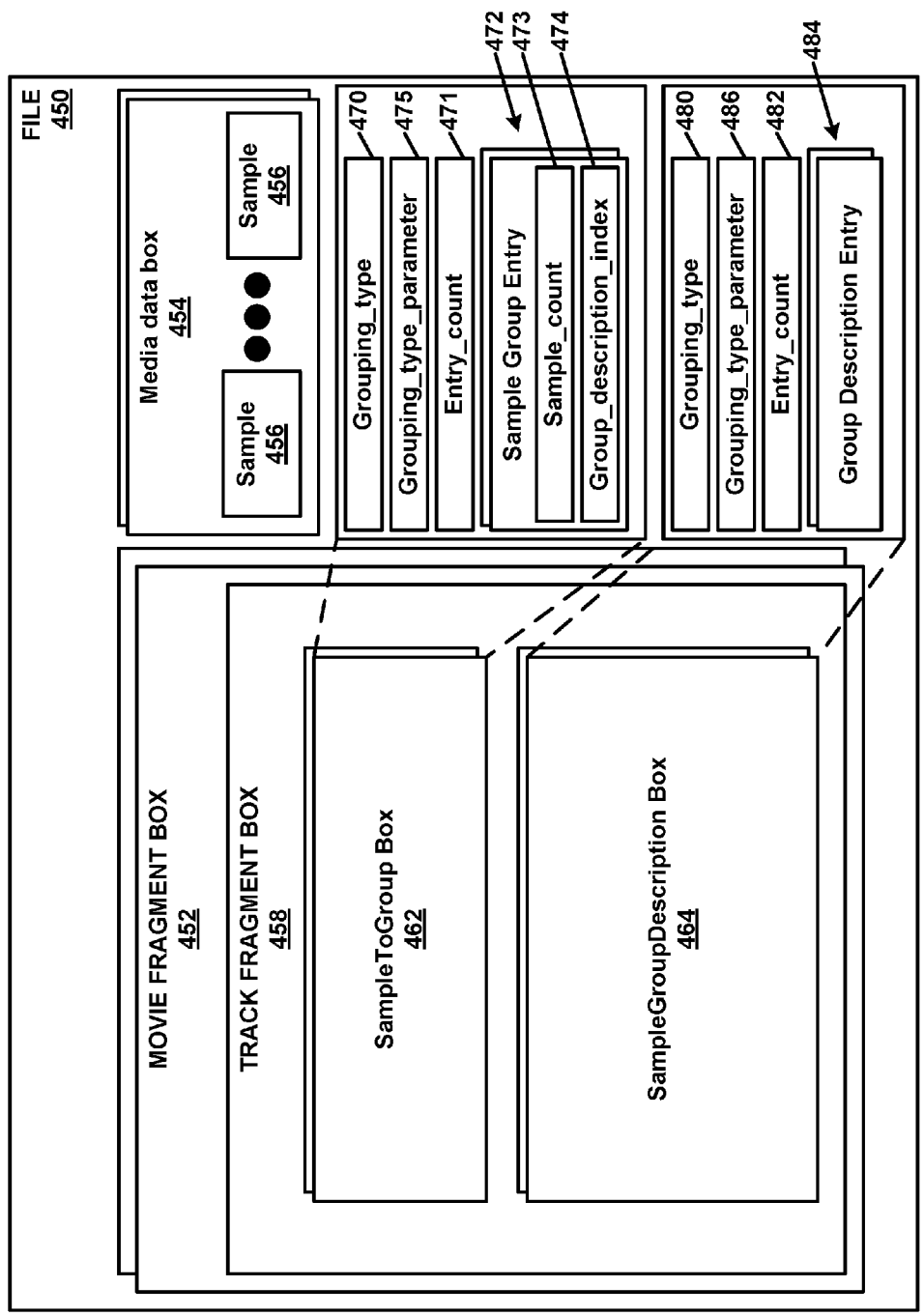
FIG. 7B is a conceptual diagram illustrating an example structure of a file, in accordance with one or more techniques of this disclosure.
Figure 7C:
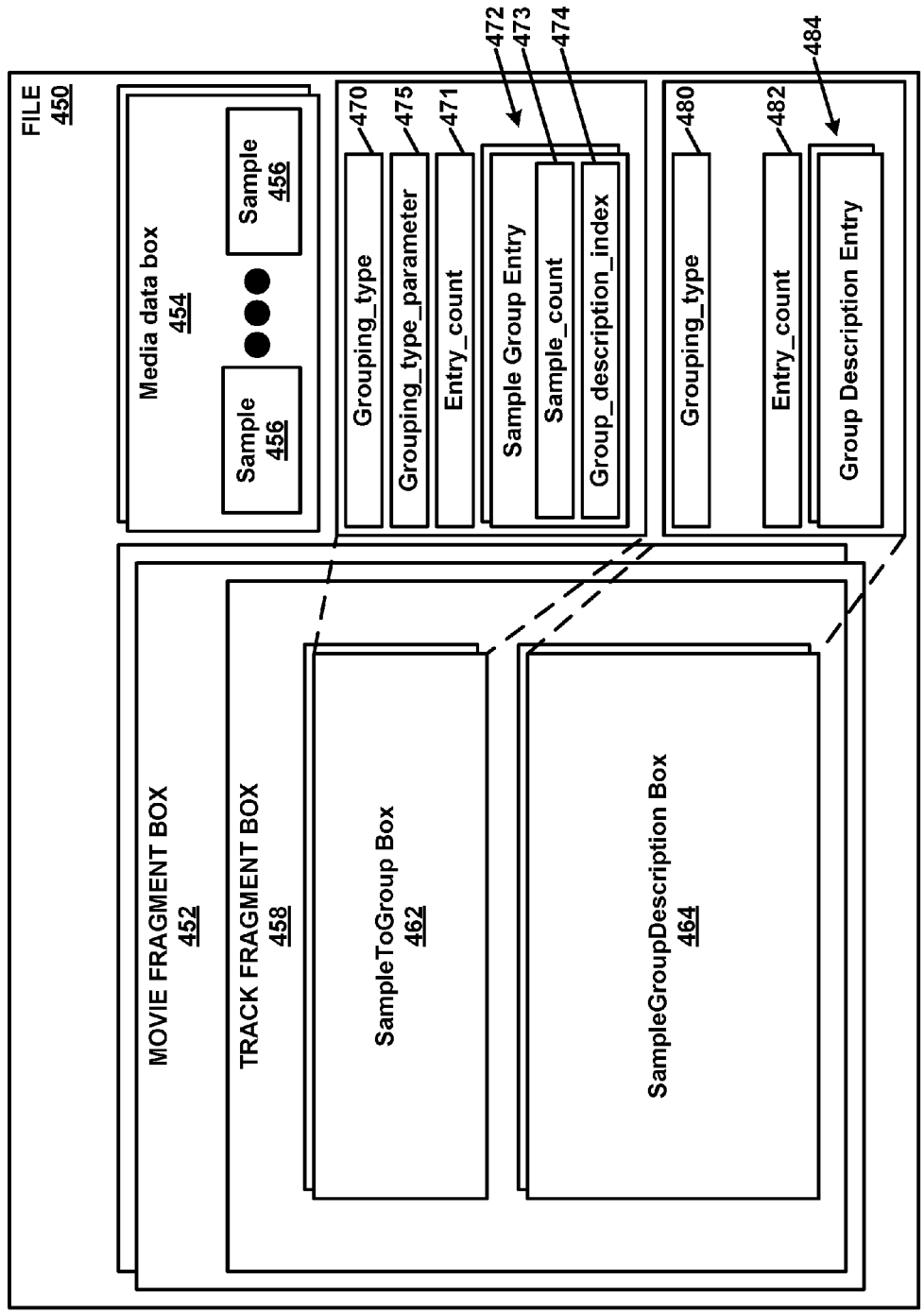
FIG. 7C is a conceptual diagram illustrating an example structure of a file, in accordance with one or more techniques of this disclosure.

FIG. 7A, FIG. 7B, and FIG. 7C are conceptual diagrams illustrating example structures of a file 450, in accordance with one or more techniques of this disclosure. FIG. 7A corresponds to the first example technique of this disclosure discussed above. FIG. 7B corresponds to the second example technique of this disclosure discussed above. FIG. 7C corresponds to the third example technique of this disclosure discussed above.

In the examples of FIG. 7A, FIG. 7B, and FIG. 7C, file 450 includes one or more Movie Fragment boxes 452 and a plurality of media data boxes 454. Although illustrated in the examples of FIG. 7A, FIG. 7B, and FIG. 7C as being in the same file, in other examples Movie Fragment boxes 452 and Media Data boxes 454 may be in separate files. Each of Media Data boxes 454 may include one or more samples 456. Each of the Movie Fragment boxes corresponds to a movie fragment. Each movie fragment may comprise a set of track fragments. There may be zero or more track fragments per track.

In the examples of FIG. 7A, FIG. 7B, and FIG. 7C, a Movie Fragment box 452 provides information regarding a corresponding movie fragment. Such information would have previously been in a Movie box, such as Movie box 302. Movie Fragment box 452 may include a Track Fragment box 458. Track Fragment box 458 corresponds to a track fragment and provides information about the track fragment.

For instance, in the examples of FIG. 7A, FIG. 7B, and FIG. 7C, Track Fragment box 458 may include one or more SampleToGroup boxes 462 and one or more SampleGroupDescription boxes 464 that contain information about the track fragment corresponding to Track Fragment box 458. Thus, Track Fragment box 458 is an instance of a "container box."

Furthermore, in the examples of FIG. 7A, FIG. 7B, and FIG. 7C, SampleToGroup box 462 includes a grouping_type syntax element 470 (i.e., a grouping type syntax element), an entry_count syntax element 471 (i.e., an entry count syntax element), and one or more sample group entries 472. Entry_count syntax element 471 indicates the number of sample group entries 472. Each of sample group entries 472 includes a sample_count syntax element 473 (i.e., a sample count syntax element) and a group_description_index syntax element 474 (i.e., a group_description_index syntax element). Sample_count syntax element 473 may indicate a number of samples associated with the sample group entry containing sample_count syntax element 473. Group_description_index syntax element 474 may identify, within a SampleGroupDescription box (e.g., SampleGroupDescription box 464), a group description entry that contains a description of the samples associated with the sample group entry containing group_description_index syntax element 474.

Additionally, in the examples of FIG. 7A, FIG. 7B, and FIG. 7C, SampleGroupDescription box 464 includes a grouping_type syntax element 480, an entry_count syntax element 482, and one or more group description entries 484. Entry_count syntax element 482 indicates the number of group description entries 484 in SampleGroupDescription box 464.

As indicated above, in the first example technique of this disclosure, the clarity issues regarding the signaling of sample groups in ISOBMFF described above may be addressed by removing the grouping_type_parameter syntax element from the Sample to Group box syntax. Thus, in accordance with the first example technique of this disclosure, which is illustrated in FIG. 7A, none of SampleToGroup boxes 462 includes the grouping_type_parameter syntax element. For instance, in accordance with the first example technique of this disclosure, SampleToGroup box 462 does not include grouping_type_parameter syntax element 475 illustrated in FIG. 7B and FIG. 7C and SampleGroupDescription box 464 does not include grouping_type_parameter syntax element 486 illustrated in FIG. 7B.

As indicated above, in the second example technique of this disclosure, the clarity issues regarding the signaling of sample groups in ISOBMFF described above may be addressed by adding a grouping_type_parameter syntax element to the syntax of the Sample Group Description box when the version of the Sample Group Description box is 1. Thus, in accordance with the second example technique of this disclosure, which corresponds to FIG. 7B, SampleToGroup boxes 462 and SampleGroupDescription boxes 464 may include grouping_type_parameter syntax elements and there is a 1-to-1 relationship between SampleToGroup boxes 462 and SampleGroupDescription boxes 464. For instance, in accordance with the second example technique of this disclosure, SampleToGroup box 462 includes grouping_type_parameter syntax element 475 and SampleGroupDescription box 464 includes grouping_type_parameter syntax element 486.

As indicated above, in the third example technique of this disclosure, the clarity issues regarding the signaling of sample group groups in ISOBMFF described above may be addressed by defining that the relationship between SampleGroupDescription box and SampleToGroup box for the same grouping_type is 1 to N. Thus, in accordance with the third example technique of this disclosure, which is illustrated in FIG. 7C, there is a 1-to-N relationship between SampleGroupDescription boxes 464 and SampleToGroup boxes 462 having grouping_type syntax elements with the same value. For instance, one of SampleGroupDescription boxes 464 may have a grouping_type syntax element having a particular value and two or more of SampleToGroup boxes 462 may also have grouping_type syntax elements having the particular value. In some examples, if two or more of SampleToGroup boxes 462 have grouping_type syntax elements with the same value, each of SampleToGroup boxes 462 in Track Fragment box 458 must be version 1. Furthermore, in some examples, if two or more of SampleToGroup boxes 462 have grouping_type syntax elements with the same value, any value of group_description_index syntax element 474 that is greater than 0 shall not be present in more than one of SampleToGroup boxes 462. In accordance with at least some implementations of the third example technique of this disclosure, SampleGroupDescription box 464 does not include grouping_type_parameter syntax element 475 shown in FIG. 7B.

Figure 8:
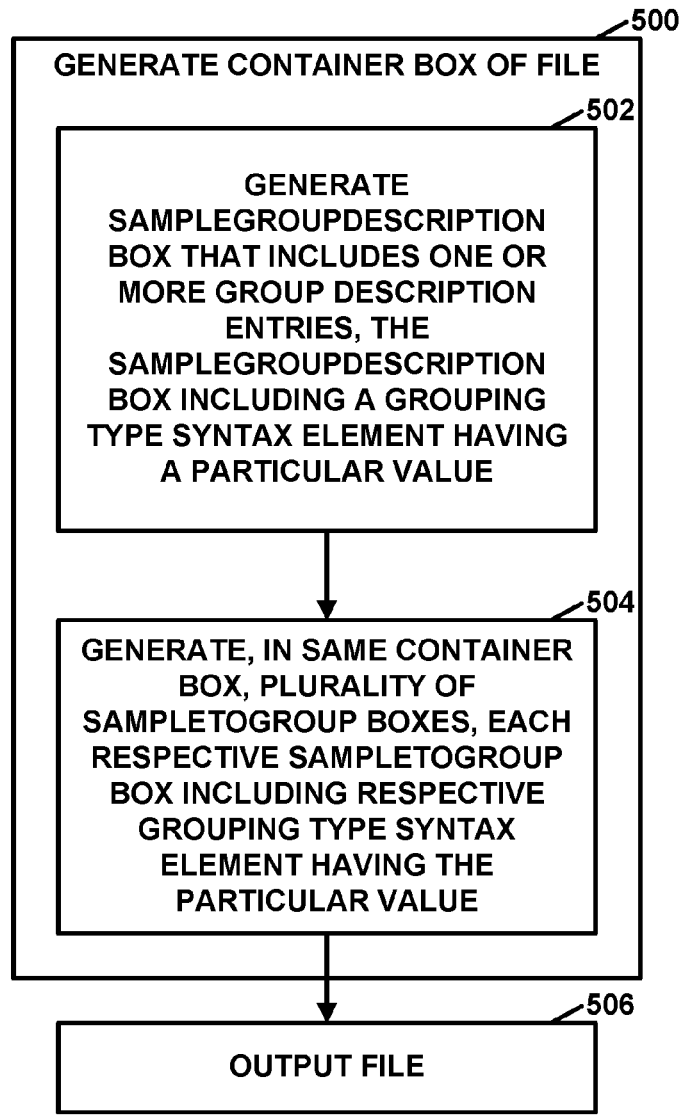
FIG. 8 is a flowchart illustrating an example operation of a source device, in accordance with a technique of this disclosure.

FIG. 8 is a flowchart illustrating an example operation of source device 12, in accordance with a technique of this disclosure. Although FIG. 8 is described with reference to source device 12, the example operation of FIG. 8 may be performed by other devices, such as file generation device 34 or another device. The flowchart of FIG. 8 is provided as an example. Other operations in accordance with the techniques of this disclosure may include more, fewer, or different actions, or the actions may be performed in a different order or in parallel.

In the example of FIG. 8, source device 12 generates a container box of the file such that the file conforms to a particular file format (500). The particular file format may be a version of the ISOBMFF modified in accordance with a technique of this disclosure. In the example of FIG. 8, as part of generating the file, source device 12 may generate a SampleGroupDescription box that includes one or more group description entries (502). Each respective group description entry may provide descriptions for a respective sample group. The SampleGroupDescription box may further include a grouping type syntax element that identifies a type of sample grouping. The grouping type syntax element in the SampleGroupDescription box may have a particular value. The container box may be a sample table box or a track fragment box. In the example of FIG. 8, the file belongs to a particular file format in which there shall only be one SampleGroupDescription box in the container box with the particular value of the grouping type syntax element.

Furthermore, in the example of FIG. 8, as part of generating the container box, source device 12 generates, in the same container box of the file, a plurality of SampleToGroup boxes (504). Each respective SampleToGroup box of the plurality of SampleToGroup boxes includes a respective grouping type syntax element having the particular value. Each respective SampleToGroup box may include one or more sample group entries. Each respective sample group entry of the one or more sample group entries may comprise a respective sample count syntax element (e.g., sample_count) indicating a number of samples in a respective sample group. Each respective sample group entry of the one or more sample group entries may comprise a respective group description index syntax element (e.g., group_description_index) indicating an index of a group description entry in the SampleGroupDescription box that provides a description of the respective sample group. Each sample of the respective sample group may comprise one or more pictures of the video contents.

In some examples, source device 12 may generate the plurality of SampleToGroup boxes such that, for each respective SampleToGroup box of the plurality of SampleToGroup boxes, the respective SampleToGroup box includes a respective grouping type parameter syntax element (e.g., grouping_type_parameter) indicating a sub-type of the type of sample grouping. Furthermore, in some examples, the file conforms to a particular file format and a requirement of the file format is that when there are multiple SampleToGroup boxes with the same value of the grouping type syntax element in a single container box, each of the multiple SampleToGroup boxes must have a respective version identifier equal to 1. In some examples, a requirement of the file format is that when there are multiple SampleToGroup boxes with the same value of the grouping type syntax element in a single container box, no two of the multiple SampleToGroup boxes shall have group description index (e.g., group_description_index) syntax elements having the same value greater than 0. Furthermore, in some examples, a requirement of the file format is that when there are multiple SampleToGroup boxes with the same value of the grouping type syntax element in a single track or track fragment, no two of the multiple SampleToGroup boxes have the same value of a grouping type parameter syntax element.

Furthermore, source device 12 may output the file (506). For example, source device 12 may output the file for storage on a computer-readable storage medium, such as a memory, magnetic media, or optical media. In another example, source device 12 may output the file for transmission.

Figure 9:
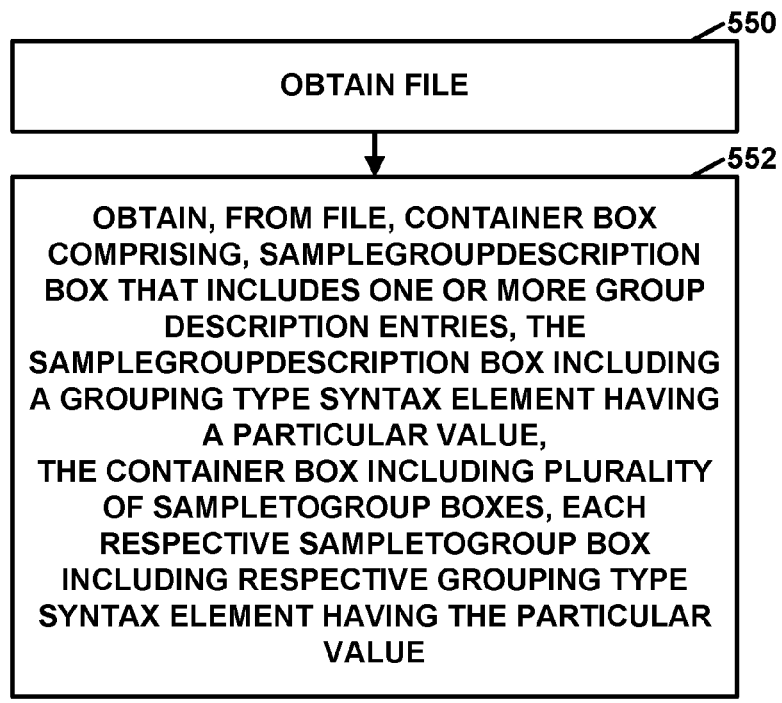
FIG. 9 is a flowchart illustrating an example operation of a device for reading a file for storage of video contents, in accordance with a technique of this disclosure.

FIG. 9 is a flowchart illustrating an example operation of a device for reading a file for storage of video contents, in accordance with a technique of this disclosure. In the example of FIG. 9, the device for reading the file may be destination device 14 of FIG. 1 or another device.

In the example of FIG. 9, the device may obtain the file (500). For example, the device may obtain the file from a data storage medium (e.g., storage medium 29 of FIG. 1), a transmission medium, or another source. For instance, the device may receive or read the file from such a source. Furthermore, in the example of FIG. 9, the device may obtain, from the file, a container box of the file (502). For instance, the device may parse or otherwise interpret the file to extract or otherwise access the container box and its content.

In some examples, the container box is a sample table box or a track fragment box. The container box may comprise a SampleGroupDescription box that includes one or more group description entries. Each respective group description entry provides descriptions for a respective sample group. Furthermore, the SampleGroupDescription box further includes a grouping type syntax element that identifies a type of sample grouping. The grouping type syntax element in the SampleGroupDescription box has a particular value. In accordance with a technique of this disclosure, a requirement of the particular file format is that there shall only be one SampleGroupDescription box in the container box with the particular value of the grouping type syntax element. The container box may also contain a plurality of SampleToGroup boxes. Each respective SampleToGroup box of the plurality of SampleToGroup boxes may include a respective grouping type syntax element having the particular value. Each respective SampleToGroup box may include one or more sample group entries. Furthermore, each respective sample group entry of the one or more sample group entries may comprise a respective sample count syntax element indicating a number of samples in a respective sample group. Each respective sample group entry of the one or more sample group entries may comprise a respective group description index syntax element indicating an index of a group description entry in the SampleGroupDescription box that provides a description of the respective sample group. Additionally, each sample of the respective sample group may comprise one or more pictures of the video contents.

The following paragraphs describe particular examples in accordance with this disclosure.

Example 1

A method of generating a file, the method comprising: generating a box that specifies a sample grouping, the sample grouping being a group of samples, wherein: the box includes a syntax element identifying a type of the sample grouping, and regardless of a version of a format of the box, the box does not include a parameter indicating a sub-type of the sample grouping; and generating the file, wherein the file includes the box.

Example 2

The method of example 1, wherein each respective one of the samples is an encoded picture.

Example 3

A method of generating a file, the method comprising: generating a first box, the first box specifying a sample grouping, the sample grouping being a group of samples; generating a second box, the second box including syntax elements providing a sample group description for the sample grouping, wherein: the second box includes a first syntax element and optionally includes a second syntax element, the first syntax element identifies a type of the sample grouping and, together with the second syntax element, if present, identifies the first box as being associated with the sample group description; the second syntax element indicating a sub-type of the sample grouping; and generating the file, wherein the file includes the first box and the second box.

Example 4

The method of example 3, wherein generating the first box comprises: generating, in the first box, a third syntax element and optionally a fourth syntax element, wherein: the third syntax element identifies the type of the sample grouping and links the sample grouping to a sample group description table with a same value of the type of the sample grouping and value of the fourth syntax element, if present, and the second syntax element indicating a sub-type of the sample grouping.

Example 5

The method of examples 3 or 4, wherein: the file includes one or more boxes specifying sample group descriptions for sample groupings for samples in a track or track fragment, within a track or track fragment, there is at most one instance of a box specifying a sample group description with a particular grouping type and sub-type.

Example 6

The method of examples 3-5, wherein: the file includes one or more boxes specifying sample groups for samples in a track or track fragment, within a track or track fragment, there is at most one instance of a box specifying a sample group with a particular grouping type and sub-type.

Example 7

A method of generating a file, the method comprising: generating a first box, the first box specifying a sample grouping, the sample grouping being a group of samples; generating a second box, the second box including syntax elements providing a sample group description for the sample grouping, wherein a relationship between SampleGroupDescription box and SampleToGroup box for the same grouping type is 1 to N; and generating the file, wherein the file includes the first box and the second box.

Example 8

A method of generating a file, the method comprising: generating a box, the box specifying a description of a sample grouping, the sample grouping being a group of samples, the box including a first syntax element and a second syntax element, the first syntax element specifying target layers, the second syntax element specifying semantics of the first syntax element; and generating the file, wherein the file includes the box.

Example 9

The method of example 8, wherein the second syntax element equal to a particular value specifies that the target layers consist of all the layers represented by a track, the second syntax element being not equal to the particular value is specified by derived media format specifications.

Example 10

A video decoding device for generating a file, the device comprising: a memory storing the file; and one or more processors configured to perform any combination of the methods of generating the file provided in any of the claims above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating a file for storage of video contents, the method comprising:
   generating a container box of the file such that the file conforms to a particular file format, wherein generating the container box comprises:
   generating, in the container box, a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and generating, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and outputting the file.

2. The method of claim 1, wherein generating the plurality of SampleToGroup boxes comprises generating the plurality of SampleToGroup boxes such that, for each respective SampleToGroup box of the plurality of SampleToGroup boxes, the respective SampleToGroup box includes a respective grouping type parameter syntax element indicating a sub-type of the type of sample grouping.

3. The method of claim 1, wherein a requirement of the particular file format is that when there are multiple SampleToGroup boxes with the same value of the grouping type syntax element in a single container box, each of the multiple SampleToGroup boxes must have a respective version identifier equal to 1.

4. The method of claim 1, wherein a requirement of the particular file format is that when there are multiple SampleToGroup boxes with the same value of the grouping type syntax element in a single container box, no two of the multiple SampleToGroup boxes shall have group description index syntax elements having the same value greater than 0.

5. The method of claim 1, wherein a requirement of the particular file format is that when there are multiple SampleToGroup boxes with the same value of the grouping type syntax element in a single track or track fragment, no two of the multiple SampleToGroup boxes have the same value of a grouping type parameter syntax element.

6. The method of claim 1, wherein the SampleGroupDescription box is a first SampleGroupDescription box and generating the container box comprises generating a second SampleGroupDescription box in the container box, the second SampleGroupDescription box having a grouping type syntax element different from the particular value.

7. A device for generating a file for storage of video contents, the device comprising:
a memory configured to store the file; and
one or more processors configured to:
generate a container box of the file such that the file conforms to a particular file format, wherein as part of generating the container box, the one or more processors:
generate a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; and
generate, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and
output the file.

8. The device of claim 7, wherein the one or more processors are configured to generate the plurality of SampleToGroup boxes such that, for each respective SampleToGroup box of the plurality of SampleToGroup boxes, the respective SampleToGroup box includes a respective grouping type parameter syntax element indicating a sub-type of the type of sample grouping.

9. The device of claim 7, wherein a requirement of the particular file format is that when there are multiple SampleToGroup boxes with the same value of the grouping type syntax element in a single container box, each of the multiple SampleToGroup boxes must have a respective version identifier equal to 1.

10. The device of claim 7, wherein a requirement of the particular file format is that when there are multiple SampleToGroup boxes with the same value of the grouping type syntax element in a single container box, no two of the multiple SampleToGroup boxes shall have group description index syntax elements having the same value greater than 0.

11. The device of claim 7, wherein a requirement of the particular file format is that when there are multiple SampleToGroup boxes with the same value of the grouping type syntax element in a single track or track fragment, no two of the multiple SampleToGroup boxes have the same value of a grouping type parameter syntax element.

12. The device of claim 7, wherein the device comprises at least one of:
an integrated circuit;
a microprocessor; or
a wireless communication device.

13. The device of claim 7, wherein the SampleGroupDescription box is a first SampleGroupDescription box and generating the container box comprises generating a second SampleGroupDescription box in the container box, the second SampleGroupDescription box having a grouping type syntax element different from the particular value.

14. The device of claim 7, further comprising a camera configured to capture the video content.

15. A device for generating a file for storage of video contents, the device comprising:
means for generating a container box of the file such that the file conforms to a particular file format, wherein the means for generating the container box comprises:
means for generating a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein the file belongs to a particular file format in which there shall only be one SampleGroupDescription box in the container box with the particular value of the grouping type syntax element; and
means for generating, in the same container box of the file, a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents; and
means for outputting the file.

16. The device of claim 15, wherein the means for generating the plurality of SampleToGroup boxes comprises means for generating the plurality of SampleToGroup boxes such that, for each respective SampleToGroup box of the plurality of SampleToGroup boxes, the respective SampleToGroup box includes a respective grouping type parameter syntax element indicating a sub-type of the type of sample grouping.

17. The device of claim 15, wherein a requirement of the particular file format is that when there are multiple SampleToGroup boxes with the same value of the grouping type syntax element in a single container box, each of the multiple SampleToGroup boxes must have a respective version identifier equal to 1.

18. The device of claim 15, wherein a requirement of the particular file format is that when there are multiple SampleToGroup boxes with the same value of the grouping type syntax element in a single container box, no two of the multiple SampleToGroup boxes shall have group description index syntax elements having the same value greater than 0.

19. The device of claim 15, wherein a requirement of the particular file format is that when there are multiple SampleToGroup boxes with the same value of the grouping type syntax element in a single track or track fragment, no two of the multiple SampleToGroup boxes have the same value of a grouping type parameter syntax element.

20. A device for reading a file for storage of video contents, the device comprising:
a memory configured to store the file; and
one or more processors configured to obtain, from the file, a container box of the file, wherein the container box comprises:
a SampleGroupDescription box that includes one or more group description entries, wherein each respective group description entry provides descriptions for a respective sample group, the SampleGroupDescription box further including a grouping type syntax element that identifies a type of sample grouping, the grouping type syntax element in the SampleGroupDescription box having a particular value, the container box being a sample table box or a track fragment box, wherein a requirement of the particular file format is that there shall only be one SampleGroupDescription box in the container box with the particular value of the grouping type syntax element; and
a plurality of SampleToGroup boxes, each respective SampleToGroup box of the plurality of SampleToGroup boxes including a respective grouping type syntax element having the particular value, each respective SampleToGroup box including one or more sample group entries, each respective sample group entry of the one or more sample group entries comprising a respective sample count syntax element indicating a number of samples in a respective sample group, and each respective sample group entry of the one or more sample group entries comprising a respective group description index syntax element indicating an index of a group description entry in the SampleGroupDescription box that provides a description of the respective sample group, each sample of the respective sample group comprising one or more pictures of the video contents.

21. The device of claim 20, wherein each respective SampleToGroup box of the plurality of SampleToGroup boxes includes a respective grouping type parameter syntax element indicating a sub-type of the type of sample grouping.

22. The device of claim 20, wherein a requirement of the particular file format is that when there are multiple SampleToGroup boxes with the same value of the grouping type syntax element in a single container box, each of the multiple SampleToGroup boxes must have a respective version identifier equal to 1.

23. The device of claim 20, wherein a requirement of the particular file format is that when there are multiple Sample- ToGroup boxes with the same value of the grouping type syntax element in a single container box, no two of the multiple SampleToGroup boxes shall have group description index syntax elements having the same value greater than 0.

24. The device of claim 20, wherein a requirement of the particular file format is that when there are multiple SampleToGroup boxes with the same value of the grouping type syntax element in a single track or track fragment, no two of the multiple SampleToGroup boxes have the same value of a grouping type parameter syntax element.

25. The device of claim 20, wherein the SampleGroupDescription box is a first SampleGroupDescription box and the container box comprises a second SampleGroupDescription box, the second SampleGroupDescription box having a grouping type syntax element different from the particular value.

* * * * *